United States Patent
Rasbornig et al.

(10) Patent No.: US 10,903,865 B2
(45) Date of Patent: *Jan. 26, 2021

(54) SIGNAL INTERFACE AND A SIGNAL PROCESSING SYSTEM

(71) Applicant: Infineon Technologies AG, Neubiberg (DE)

(72) Inventors: Friedrich Rasbornig, Klagenfurt (AT); Robert Hermann, Voelkermarkt (AT); Wolfgang Granig, Seeboden (AT); Bernhard Schaffer, Villach (AT); Wolfgang Scherr, Villach (AT); Michael Strasser, Villach (AT)

(73) Assignee: Infineon Technologies AG, Neubiberg (DE)

(*) Notice: Subject to any disclaimer, the term of this patent is extended or adjusted under 35 U.S.C. 154(b) by 804 days.

This patent is subject to a terminal disclaimer.

(21) Appl. No.: 14/604,063

(22) Filed: Jan. 23, 2015

(65) Prior Publication Data

US 2015/0194992 A1 Jul. 9, 2015

Related U.S. Application Data

(63) Continuation-in-part of application No. 13/750,444, filed on Jan. 25, 2013, now Pat. No. 10,756,857.

(51) Int. Cl.
*H04L 12/58* (2006.01)
*H04B 1/16* (2006.01)
*H04L 29/06* (2006.01)

(52) U.S. Cl.
CPC ............. *H04B 1/16* (2013.01); *H04L 51/066* (2013.01); *H04L 69/08* (2013.01)

(58) Field of Classification Search
CPC ...................................................... H04L 69/08
See application file for complete search history.

(56) References Cited

U.S. PATENT DOCUMENTS 5,166,664 A * 11/1992 Fish .................... G08B 25/10
340/505
5,828,850 A 10/1998 Misaka
(Continued)

FOREIGN PATENT DOCUMENTS

CN 104937908 A 9/2015

OTHER PUBLICATIONS

Search Report dated Dec. 7, 2016 for French Patent Application No. 1400024.
(Continued)

*Primary Examiner* — Moustafa M Meky
*Assistant Examiner* — Sm Z Islam
(74) *Attorney, Agent, or Firm* — Schiff Hardin LLP

(57) ABSTRACT

A signal interface for a receiver includes a first receiver module configured to receive a first message related to a content. The first receiver module is configured to generate a first adapted message based on the first message and a first transformation protocol. The signal interface further includes a second receiver module configured to receive a second message related to the content. The second receiver module is configured to generate a second adapted message based on the second message and a second transformation protocol. The first transformation protocol associated with the first receiver module and the second transformation protocol associated with the second receiver module are different.

31 Claims, 12 Drawing Sheets

(56) References Cited

U.S. PATENT DOCUMENTS

| | | | |
|---|---|---|---|
| 6,493,401 B1* | 12/2002 | Erckert | B60R 16/0315 375/224 |
| 6,522,689 B1* | 2/2003 | Heinrich | H04L 12/40032 375/224 |
| 7,295,578 B1 | 11/2007 | Lyle et al. | |
| 7,589,431 B2 | 9/2009 | Hentsch et al. | |
| 7,660,305 B1 | 2/2010 | Wiget et al. | |
| 8,503,501 B2 | 8/2013 | Saito et al. | |
| 2001/0020281 A1 | 9/2001 | Retter et al. | |
| 2002/0001225 A1 | 1/2002 | Poechmueller | |
| 2003/0026251 A1* | 2/2003 | Morris | H04L 49/90 370/389 |
| 2003/0043750 A1 | 3/2003 | Remboski et al. | |
| 2003/0095367 A1 | 5/2003 | Mares et al. | |
| 2004/0055370 A1* | 3/2004 | Normann | B60C 23/009 73/146 |
| 2004/0120356 A1* | 6/2004 | Davenport | H04B 3/54 370/516 |
| 2004/0120405 A1* | 6/2004 | Jaussi | H04B 3/03 375/257 |
| 2005/0040709 A1 | 2/2005 | Enders et al. | |
| 2006/0133601 A1 | 6/2006 | Ferianz | |
| 2006/0195018 A1 | 8/2006 | Guillen | |
| 2007/0060394 A1 | 3/2007 | Gowin et al. | |
| 2007/0160075 A1* | 7/2007 | Carpassi | H04L 12/40032 370/451 |
| 2008/0094317 A1 | 4/2008 | Kim | |
| 2008/0312860 A1 | 12/2008 | Bauerle | |
| 2009/0003464 A1 | 1/2009 | Matsubara et al. | |
| 2009/0046773 A1* | 2/2009 | Scherr | H04L 5/1484 375/238 |
| 2009/0144385 A1 | 6/2009 | Gold | |
| 2009/0216408 A1 | 8/2009 | Ueno | |
| 2010/0002821 A1 | 1/2010 | Hammerschmidt et al. | |
| 2010/0118887 A1* | 5/2010 | Matsumoto | H04L 12/403 370/465 |
| 2012/0019354 A1* | 1/2012 | Saldin | H04L 63/1408 340/5.1 |
| 2012/0074972 A1 | 3/2012 | Rasbornig et al. | |
| 2012/0106976 A1 | 5/2012 | Bernard et al. | |
| 2012/0195400 A1* | 8/2012 | Tomar | H04L 7/0331 375/354 |
| 2013/0163995 A1* | 6/2013 | Uemura | H04B 10/504 398/136 |
| 2013/0198422 A1* | 8/2013 | Subbiah | H04L 29/06 710/71 |
| 2013/0287143 A1* | 10/2013 | Davies | H04L 1/08 375/316 |
| 2013/0344834 A1 | 12/2013 | Souto Diez | |
| 2013/0345924 A1* | 12/2013 | Tomar | G01P 15/125 701/30.5 |
| 2014/0003582 A1* | 1/2014 | Poulo | A61B 6/032 378/91 |
| 2014/0081120 A1* | 3/2014 | Valdastri | A61B 34/76 600/409 |
| 2015/0180482 A1* | 6/2015 | Bourstein | H03L 7/00 323/234 |

OTHER PUBLICATIONS

Office Action dated Mar. 29, 2019 for Chinese Patent Application No. 201710728664.3.

\* cited by examiner

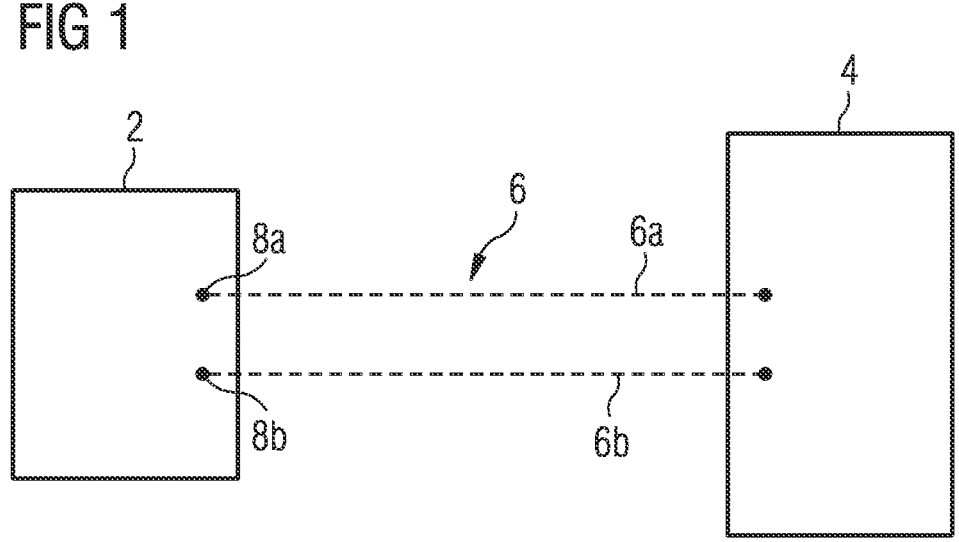
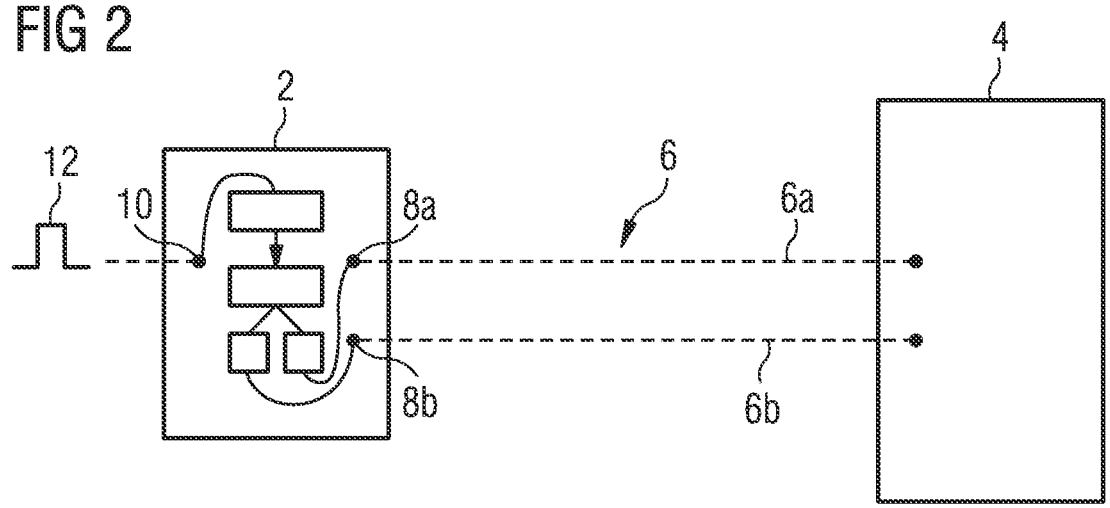

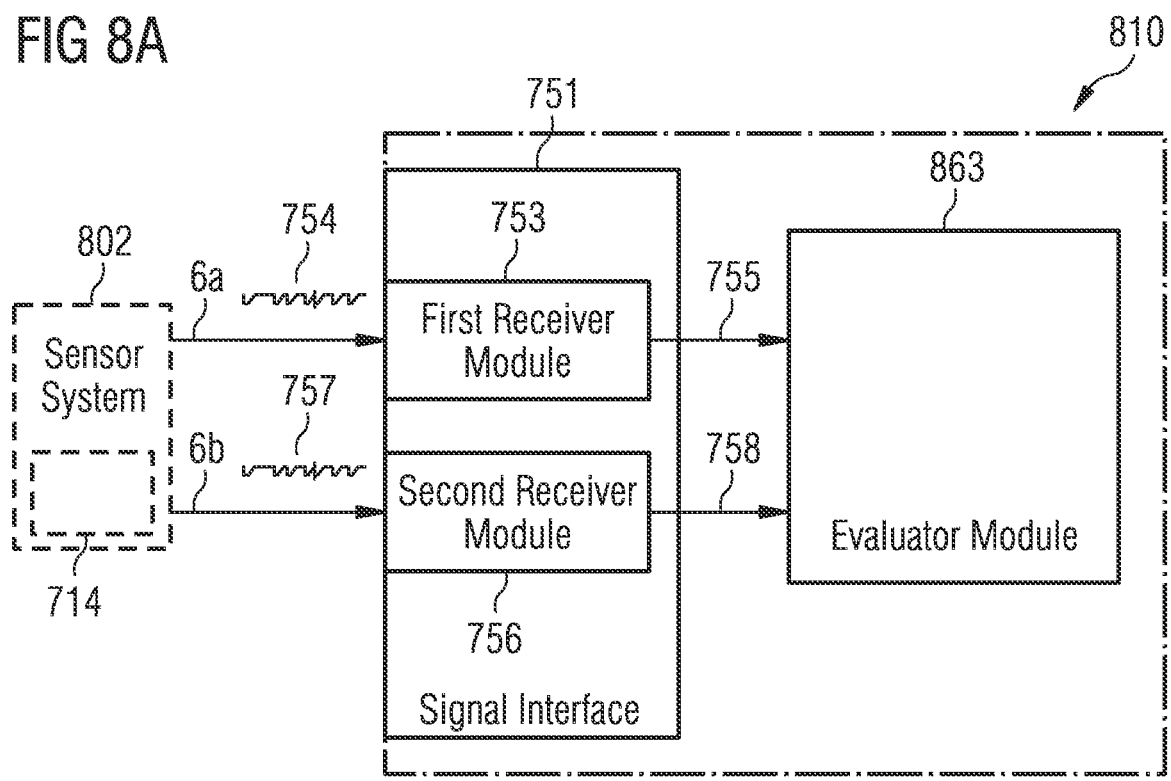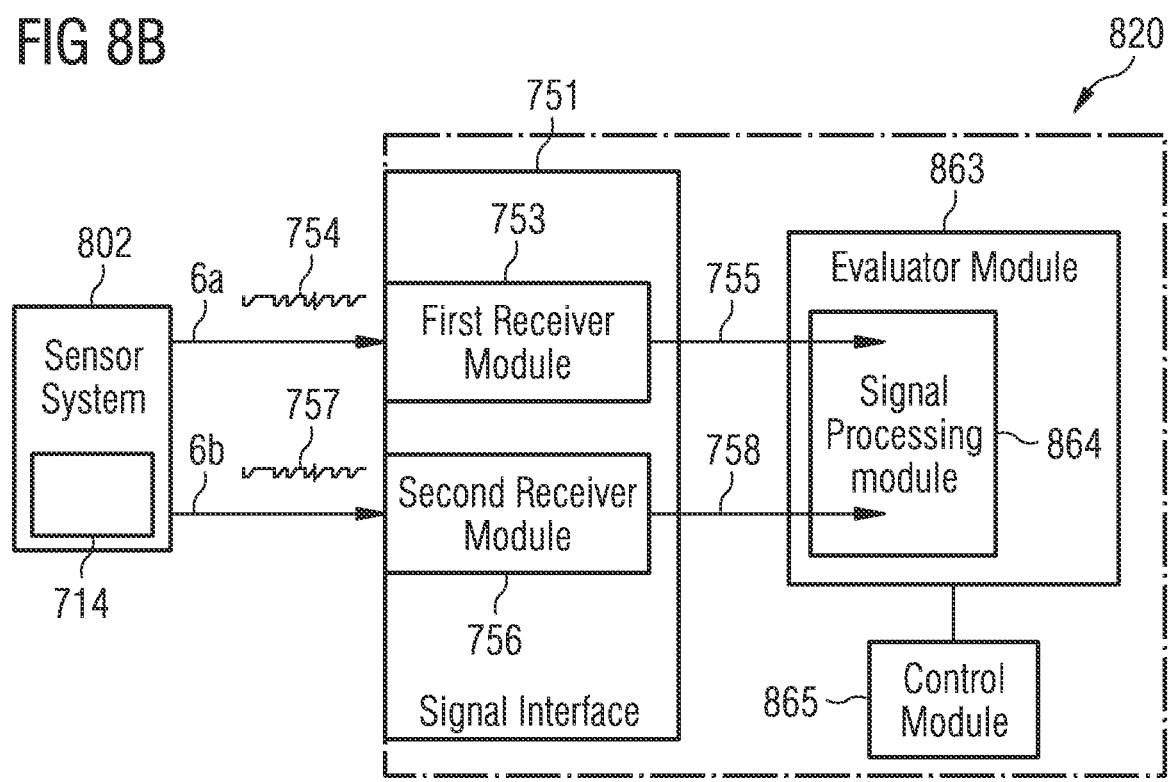

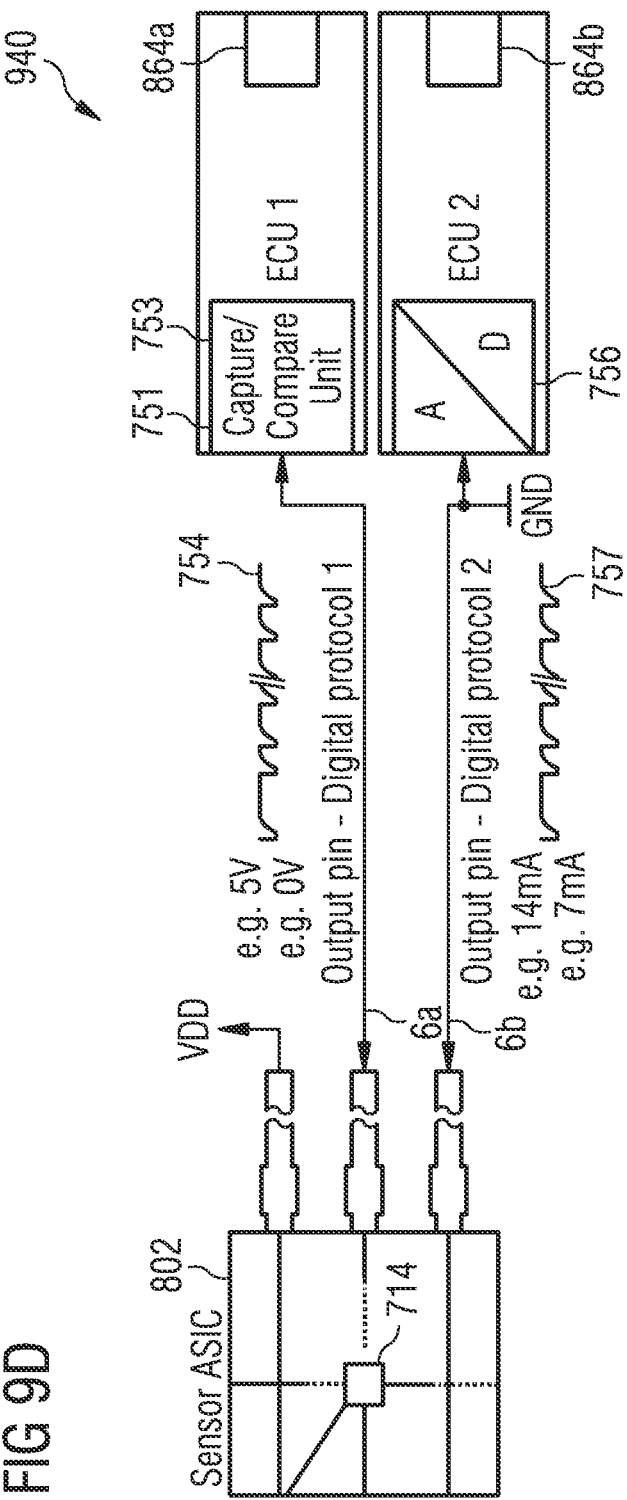

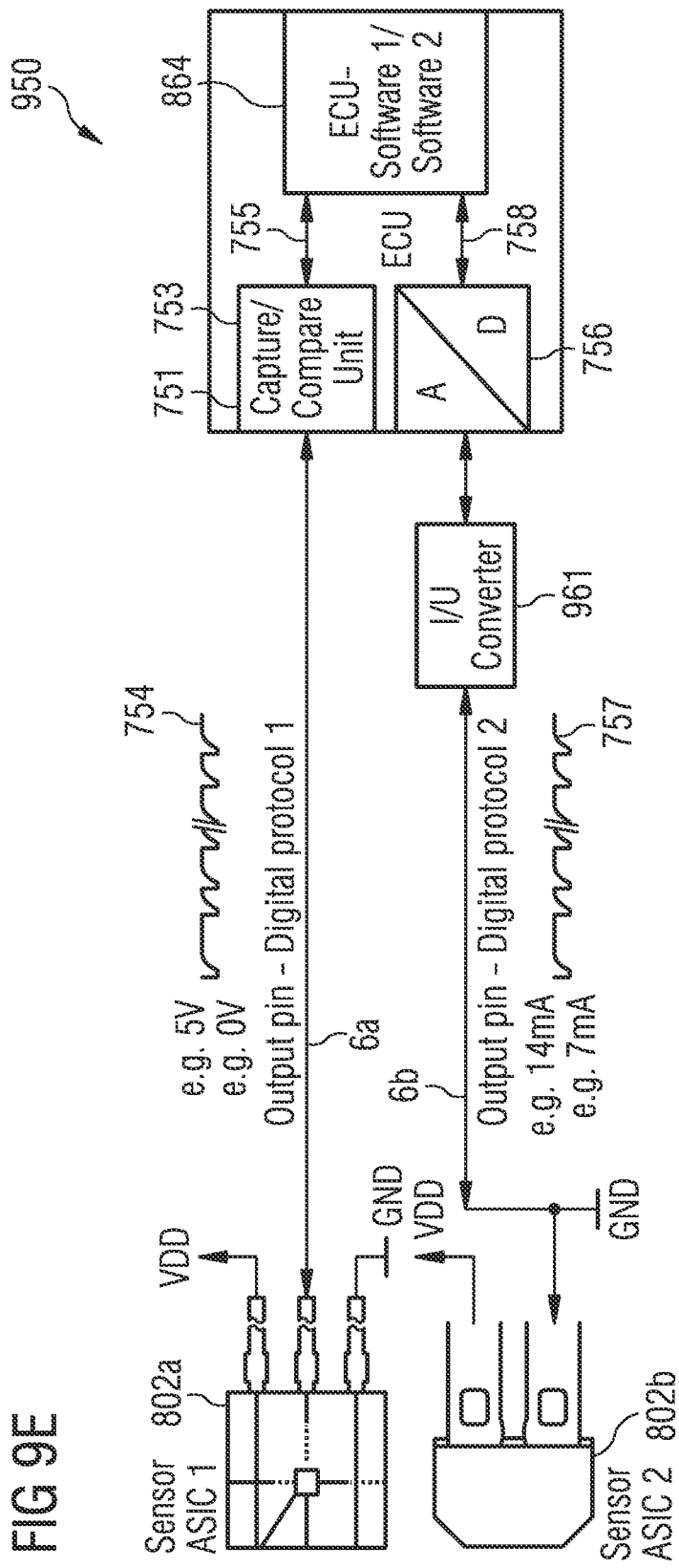

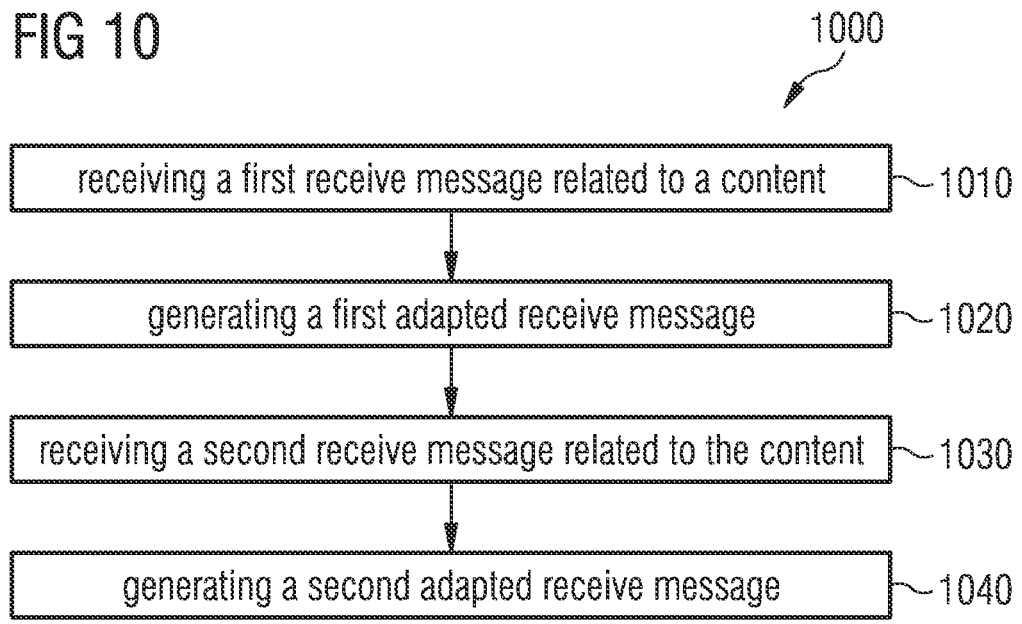
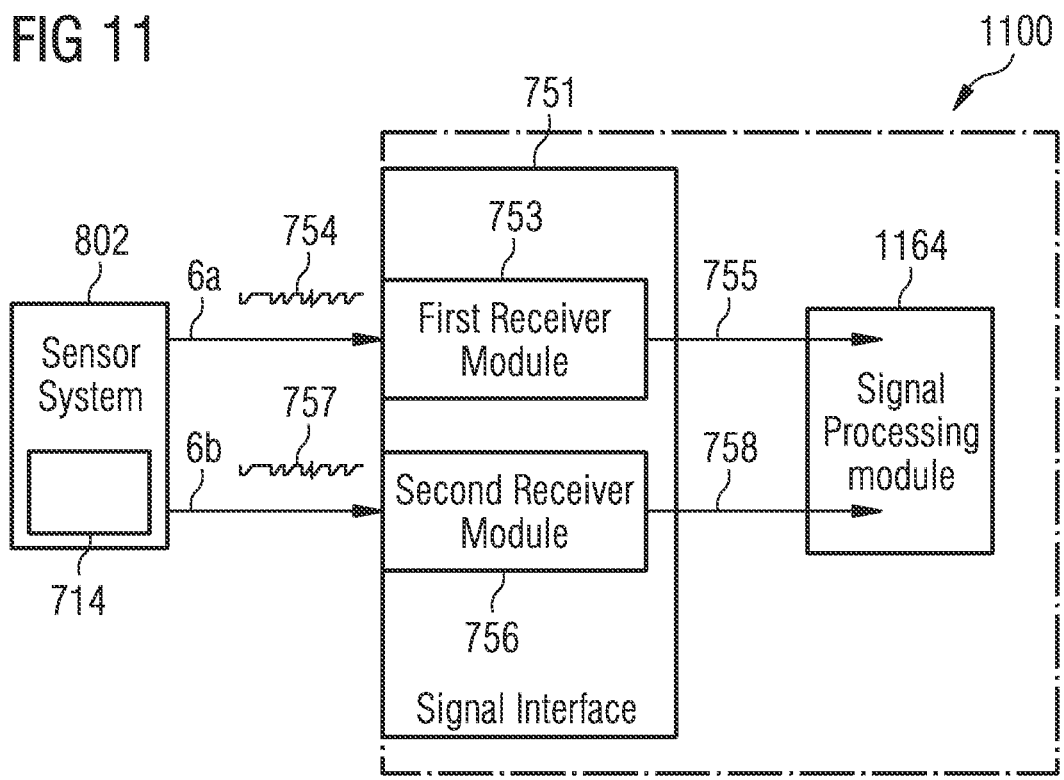

SIGNAL INTERFACE AND A SIGNAL PROCESSING SYSTEM

This application is a continuation-in-part of U.S. application Ser. No. 13/750,444, filed 25 Jan. 2013, the contents of which are herein incorporated by reference in its entirety. Embodiments relate to signal control devices and in particular to a signal interface, a signal processing system, a method for receiving signals and a controller operable to transmit digital data messages.

TECHNICAL FIELD

Background

Safety requirements related to the use of sensors and control devices (e.g. Electronic Control Units ECU) in the automotive fields, particularly in security or safety-critical applications (e.g. steering torque), have been constantly increasing in recent years. These requirements related to the functional safety of electronic systems in personal motor vehicles are laid out in the International Functional Safety Standard ISO 26262. There are greater demands to provide an appropriate redundancy of the used functional blocks, so that failures may be more easily recognized or detected internally or externally.

Content or messages are transmitted in numerous applications. For example, Ethernet or related techniques are used to transfer a large amount of data within the network of a company or via the internet. On a smaller scale, data is for example transmitted within vehicles, such as for example within an automobile in order to operate power windows or the like. Modern vehicles also utilize numerous sensors in order to monitor environmental conditions, i.e. physical quantities related to the operation of the vehicle or particular components thereof.

Failure of the transmission of digital data messages between a controller and a corresponding receiver via a communication link may result in a complete loss of the information intended to be transmitted. Moreover, in more complicated interrelated systems, a broken communication link may also result in the whole system becoming inoperable or becoming inefficient. Therefore, there is a desire to increase functional safety and reliability in the communication of data messages.

SUMMARY

Some embodiments relate to a signal interface for a receiver. The signal interface includes a first receiver module configured to receive a first message related to a content. The first receiver module is configured to generate a first adapted message based on the first message and a first transformation protocol. The signal interface further includes a second receiver module configured to receive a second message related to the content. The second receiver module is configured to generate a second adapted message based on the second message and a second transformation protocol. The first transformation protocol and the second transformation protocol are different.

Some embodiments relate to a signal processing system. The signal processing system includes a signal interface. The signal interface includes a first receiver module configured to receive a first message related to a content. The first receiver module is configured to generate a first adapted message based on the first message and a first transformation protocol. The signal interface further includes a second receiver module configured to receive a second message related to the content. The second receiver module is configured to generate a second adapted message based on the second message and a second transformation protocol. The first transformation protocol and the second transformation protocol are different. The signal processing system further includes an evaluator module configured to determine whether at least one first characteristic related to the first adapted message is in a predefined relationship with at least one second characteristic related to the second adapted message.

Some embodiments relate to a method for receiving signals. The method comprises receiving by a first receiver module a first message related to a content. The method further comprises generating a first adapted message based on the first message and a first transformation protocol. The method further comprises receiving by a second receiver module a second message related to the content. The method further comprises generating a second adapted message based on the second message and a second transformation protocol different to the first transformation protocol.

BRIEF DESCRIPTION OF THE FIGURES

Some embodiments of apparatuses and/or methods will be described in the following by way of example only, and with reference to the accompanying figures, in which FIG. 1 shows an exemplary embodiment of a controller and a corresponding receiver capable of communicating together via a communication link;

FIG. 2 shows a further exemplary embodiment of a controller;

FIG. 8A shows a schematic illustration of a signal processing system including a signal interface for a receiver and an evaluator module;

FIG. 8B shows a schematic illustration of a signal processing system including a signal interface for a receiver, a signal processing module and an evaluator module;

FIG. 9D shows a schematic illustration of a signal processing system including two electronic control units;

FIG. 9E shows a schematic illustration of a signal processing system including two sensor systems;

FIG. 10 shows a flow chart of a method for receiving signals; and

FIG. 11 shows a schematic illustration of a signal processing system including a signal interface for a receiver and signal processing module.

DETAILED DESCRIPTION

Figure 3:
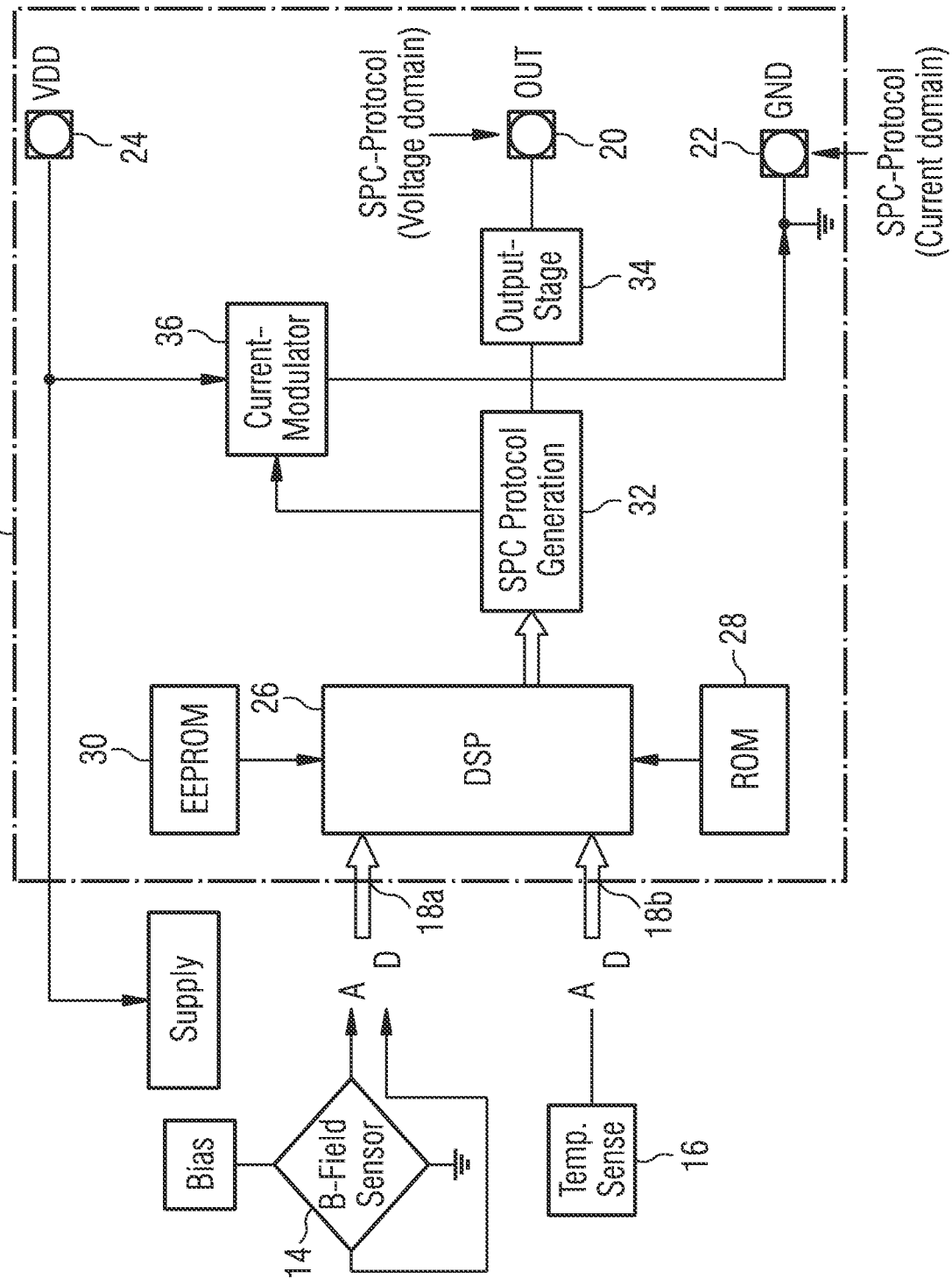
FIG. 3 shows an example for a sensor system incorporating an embodiment of a controller.

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

FIG. 1 shows a schematic illustration of an exemplary embodiment of a controller 2 for transmitting digital data messages to a receiver 4 via a communication link 6, the communication link 6 having at least a first transmission path 6a and a second transmission path 6b. That is, the communication link 6 provides the possibility to transmit messages via two different transmission paths 6a and 6b. A communication link in that sense can be understood to be any physical coupling between the controller 2 and the corresponding receiver 4 which allows digital transmission of data messages from the controller 2 to the receiver 4. For example, this can be a wired data bus having two, three or any arbitrary larger number of bus lines in order to distribute or transmit currents or voltage pulses/levels or the like. Further examples for a communication link are one or more fibers in order to transmit optical signals or an air interface, i.e. a wireless connection, where different interface techniques can be incorporated as independent transmission techniques. An example for a wireless transmission technique can be one of the mobile communication systems or transceivers standardized by the 3rd Generation Partnership Project (3GPP), as Global System for Mobile Communications (GSM), Enhanced Data rates for GSM Evolution (EDGE), GSM EDGE Radio Access Network (GERAN), Universal Terrestrial Radio Access Network (UTRAN) or Evolved UTRAN (E-UTRAN), e.g. Universal Mobile Telecommunication System (UMTS), Long Term Evolution (LTE) or LTE-Advanced (LTE-A), or mobile communication systems with different standards, e.g. Multistandard Radio (MSR), Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Code Division Multiple Access (CDMA), Orthogonal Frequency Division Multiple Access (OFDMA), WirelessHART (IEC 6259) or any other technology with a multiplexing capable physical layer like Filter Bank Based Multicarrier (FBMC) systems. Of course, short range communication systems such as Bluetooth or ZigBee also can be used.

Since different techniques rely on different modulation and transmission schemes, they can be vulnerable to different kinds of distortions so that, even when one transmission technique fails to accomplish a transmission of a digital data message, the same can still be transmitted by the second transmission technique. When using, for example, a wired data bus having at least two bus lines, one bus line can be used to digitally transmit a first message to the receiver using a variation of a voltage on the bus line, while the second message can be transmitted using a varying current on the second bus line.

In order to provide the signals for the transmission over the first and second transmission paths 6a and 6b, the controller 2 comprises a first signal terminal 8a for the first transmission path 6a and a second signal terminal 8b for the second transmission path 6b. That is, the signals used to transmit the digital messages according to the first transmission technique and the second transmission technique are provided at the signal terminals 8a and 8b, respectively. Those can, for example, be directly connected to bus lines of a wired data bus or to antennas of a wireless communication system or the like.

According to one exemplary embodiment, content transmitted by the first and the second messages via the first and the second transmission paths 6a and 6b is identical so as to increase functional safety and reliability of the system since the content can still be received even when one of the transmission paths is disturbed or broken.

According to some embodiments, an order of bits used for a digital transmission of the content is different within the first message and the second message when the same content is transmitted by both messages. That is, the bit pattern to transmit the same content using the different transmission techniques can additionally be scrambled or modified in a predetermined manner so as to still increase the reliability of the system. For example, the individual bits of the second message can be the inverse of the bits of the first message. Even in the unlikely event that an error affects both transmission techniques in parallel and at the same time, there is still a chance to recover the content when different parts of the content are affected.

According to some exemplary embodiments, the length of a first sequence of bits used to transmit the content in the first message and of a second sequence of bits used to transmit the identical content in the second message is identical, wherein the bit value of each bit at a given position in the first sequence is the inverse of the bit value of the bit at the same position in the second sequence. That is, the first message can be the bit-wise inverse of the second message, which can provide for additional redundancies due to interrelated properties of a redundancy information such as, for example, a cyclic redundancy check value (CRC) which can be computed and appended to the first and second sequences of bits individually prior to their transmission.

According to some exemplary embodiments, at least one message of the group of the first message and the second message is transmitted using a serial transmission protocol using signals of varying width to represent digital content. To this end, a signal of varying width can be understood to be a pulse width modulated signal (PWM) where a digital quantity is represented by a fraction of a predetermined pulse length in which the signal is transmitted with a characteristic corresponding to one logical state, while the signal is transmitted with another characteristic corresponding to another logical state in the remaining time of the predetermined pulse length. To this end, the predetermined pulse length can be understood as a common clock time interval on which the protocol relies and which, therefore, should be available at the sender and at the receiver.

However, a signal of varying width shall generally be understood herein as any transmitted pulse shape or pulse formation in which a characteristic length or time can be varied so as to represent digital content. For example, two signal pulses of similar or identical shape which are transmitted with a varying time difference are also understood to be a signal of varying width. That is, the signal corresponds to the first pulse, the second pulse and the signal waveform between the pulses. The use of a transmission protocol using signals of varying width to represent digital content can permit use of simple and inexpensive devices due to the simplicity of the representation, which can furthermore provide for a high robustness with respect to a superposition of external noise signals and the like.

According to some exemplary embodiments, a common clock time interval for the transmission according to the serial transmission protocol is signaled from the controller to the receiver using a preamble to a content of a transmitted message, wherein a time difference between two signal pulses in the preamble corresponds to an integer multiple of the common clock time interval. That is, the common clock time interval is defined by the transmitter and provided to the receiver. This can provide an extremely high flexibility in systems design since the controller can collaborate with a wide range of receivers or chips receiving the transmitted messages due to the fact that the controller defines the clock cycles used within the protocol itself. Especially in sensor systems, where the sensors and associated controllers are typically provided with large structural sizes allowing for only moderate operating frequencies, this can permit combining sensors with nearly arbitrary receivers or control units having a receiver, without the need to provide receivers tailored to one particular sensor. U.S. Patent Application Publication Nos. 2009/046773A1 and 2010/002821 A1 disclose particular ways to use a preamble to provide a common clock time interval from the controller to the receiver. These documents are incorporated herein by reference in their entireties, and the provision of a common clock time interval as disclosed in those applications is expressly defined as a part of a particular exemplary embodiment.

According to some exemplary embodiments, a digital quantity is represented by two consecutive signal pulses transmitted with a time difference of a predetermined number of common clock time intervals, the predetermined number being related to the digital quantity. For example, the predetermined number of common clock time intervals between the two signal pulses directly equals a number to be transmitted using the serial transmission protocol. That is, if the number four is to be transmitted, the second signal pulse is sent four common clock time intervals after the first signal pulse. Each sequence of two signal pulses (which is a signal of varying width) representing a number or is also referred to as a nibble. With respect to one particular embodiment of a protocol to digitally transmit data using nibbles, reference is again made to U.S. Patent Application Publication Nos. 2009/046773A1 and 2010/002821 A1. The protocols described therein shall be understood to be part of one particular exemplary embodiment.

According to some embodiments, the serial transmission protocol associated with the first transmission technique is the SENT (Single Edge Nibble Transmission, SAE J2716 standard) protocol or the SPC (Short PWM Code) protocol. According to further embodiments, only the second transmission technique uses one of these two protocols. According to yet further embodiments, both transmission techniques rely on the SPC or the SENT protocol or, more generally, on the same protocol. To this end, a protocol shall be understood to be a rule with respect to how digital data is mapped into symbols or bit sequences or generally into quantized information to be transmitted at a time by a transmission technique. It is important to note that, while the protocol can be the same for the transmission over both transmission paths, the transmission technique itself, i.e. the particular way the information is physically transmitted over the corresponding transmission medium, can be different. For example, a transmission technique in that sense can be equal to the physical layer of a typical protocol stack, while the SPC or SENT protocol or the logical protocol as referred to herein, shall be associated to one single or a combination of several higher layer protocols of the protocol stack. In that sense, digitally transmitting can be understood to prepare digital data for transmission according to one of those protocols, while the transmission via a physical layer itself according to a transmission technique can typically use analog signals or quantities. Of course, other exemplary embodiments can use different protocols, such as, for example, pulse width modulation (PWM), Peripheral Sensor Interface 5 (PSI5, as standardized and developed further by the PSI5 organization, http://psi5.org), Peripheral Acceleration Sensor protocol (PAS3/PAS4), Distributed Systems Interface (DSI, as standardized and developed further by the DSI Consortium, http://www.dsiconsortium.org). The individual protocols can be used to transmit one of the first message and the second message individually or to transmit both messages using the same protocol. It is additionally noted that arbitrary other protocols suitable to digitally transmit messages can be used in further exemplary embodiments which expressly also includes any future developments of those protocols.

Hence, data of the same protocol can, for example, be transmitted by a transmission technique relying on or being implemented in the voltage domain and, in parallel, by a second transmission technique relying on or being implemented in the current domain. That is, variations in voltage of a voltage level or voltage pulses can be used to transmit the first message according to the first transmission technique via signal terminal 6a, while, at the same time, variations of a current on the second signal terminal 6b can be used to transmit the second message according to the second transmission technique. This can be beneficial in that, for example, additional voltages can be induced in the bus lines in the presence of a magnetic field, while the current-based transport technique can be fairly robust with respect to the presence of magnetic fields.

FIG. 2 shows a further exemplary embodiment of a controller 2, operable to transmit digital data messages to the receiver 4 via the communication link 6. The controller 2 of the embodiment illustrated in FIG. 2 additionally comprises a sensor input terminal 10 for receiving a sensor input signal 12 which is indicative of a physical quantity sensed by a sensor. That is, the controller 2 illustrated in FIG. 2 is operable to be coupled to a sensor, such as to receive a sensor input signal indicative of a physical quantity sensed by a sensor and to transmit messages containing information on the sensor input signal to the corresponding receiver 4. This can, for example, be useful in automotive applications, where the sensor data serves to provide input to driving assistant systems, which in return means that a loss of sensor data may result in failure of the system and hence in an injury of a driver. To increase the functional safety, the sensor input signal 12 is first processed by a common part of a protocol stack in the controller 2. However, the transmission over the first and second transmission paths 6a and 6b is ultimately performed by two different transmission techniques in order to provide for the required functional safety of the system. To this end, the protocol stack implement in the controller 2 could be seen as a protocol stack having higher layers in common, while, at the same time, providing for two physical layer protocols or interfaces.

According to two further exemplary embodiments of controllers or sensor systems discussed with respect to FIGS. 3 and 4 in the following, the higher layers of the protocol stack or the transmission protocol can be the SPC-protocol, introduced to allow an efficient readout of sensor data in automotive applications via a simple three wired bus.

While SENT is a unidirectional communication standard where data from a sensor is transmitted autonomously without any intervention of the data receiving device, i.e. the receiver, SPC provides for the possibility of a half-duplex synchronous communication, where the receiver triggers a transmission. Generally, in SENT and SPC, a signal is transmitted from the controller or the sensor by a series of pulses, where the distance between consecutive falling edges of the associated pulses defines the transmitted data words. That is, the number of consecutive clock cycles (e.g. three microseconds) between two consecutive pulses corresponds to the transmitted symbol or data directly.

FIG. 3 shows an exemplary embodiment of a sensor system comprising a controller 2 and a magnetic-field sensor 14 as well as a temperature sensor 16. The controller 2, i.e. the sensor system of FIG. 3 is implemented to be compatible with a standard SPC-application, as it can be used in automotive applications to read out data of sensors. While the application in FIG. 3 shows a combination of a magnetic field sensor 14 and a temperature sensor 16 to be read out or to be controlled by the controller 2, further embodiments, of course, can also utilize different sensor types to sense or monitor different physical quantities. For example, a physical quantity sensed by a sensor can be a voltage, a current, a resistance, a pressure, a force, a position/location, a strain, a magnetic or electric field or the like. According to the embodiment illustrated in FIG. 3, the controller 2 comprises a first and a second sensor input terminal 18a and 18b, having connected thereto the sensors 14 and 16. In the particular embodiments of FIGS. 3 and 4, the sensor input signals are already converted from analog to digital so as to represent the physical quantity as sensed by the individual sensor by a digital representation or number. According to further embodiments, however, sensor-raw data can also be provided to the sensor input terminal, so as, for example, voltages or currents derived by the individual sensor elements directly. In those embodiments, the conversion of the sensor-raw data or signal into a digital representation can also be performed by the controller 2 itself.

Figure 4:
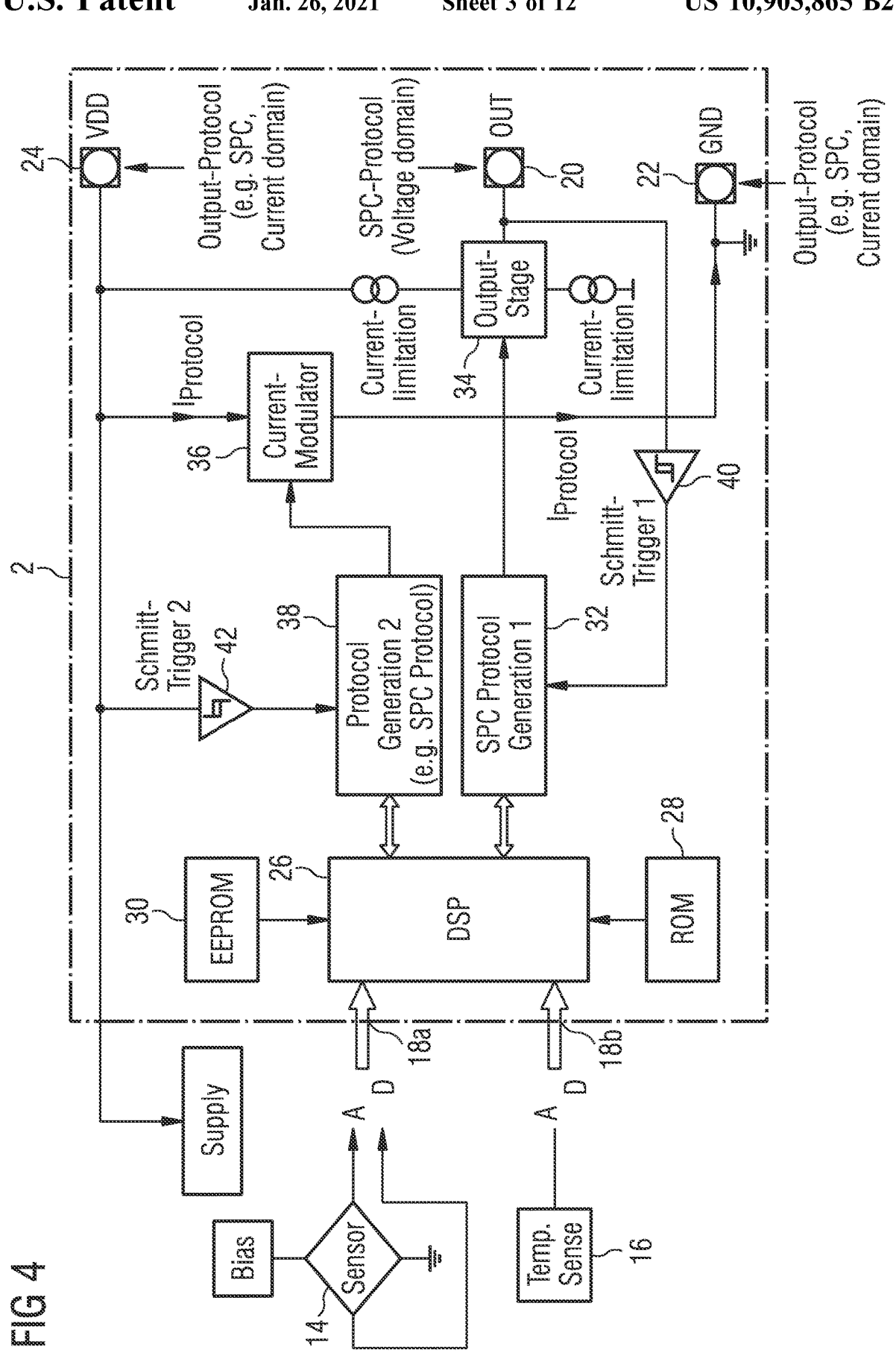
FIG. 4 shows an example of a sensor system incorporating an embodiment of a controller in a backwards-compatible manner.

As the controller 2 of FIGS. 3 and 4 is designed to be operable with SPC-compliant receivers, the controller comprises three signal terminals, a first signal terminal 20 for a first transmission path, a second signal terminal 22 for the provision of ground or, more generally, of a reference potential and a third signal terminal 24 for the provision of an operating voltage powering the controller and the associated sensors.

In this particular embodiment, the controller 2 comprises a digital signal processor (DSP) 26 having stored its associated program logic in read-only memory (ROM) 28, and having access to further data stored in an erasable EPROM (EEPROM) 30. While the read-only memory comprises data required for the operation of the DSP 26 itself, the EEPROM 30 can, for example, comprise additional data, such as, for example, calibration data for the sensors associated with the controller 2, serial numbers, manufacturer codes or the like.

The controller 2, in particular the DSP 26, receives, via the sensor input terminals 18a and 18b, sensor input signals indicative of the physical quantities sensed by the individual sensors.

The DSP 26 then provides a first and a second message, comprising information on at least one of the sensor signals of the sensors 14 or 16. That is, a representation of the content provided by the sensors 14 and 16, that is of the sensor signals, is transformed to appropriate messages or to an appropriate message format. The message, that is the digital representation of the content, is then transferred to an SPC protocol generator 32 which transfers the message into the transmission format as required by the SPC standard. The protocol generator 32 provides the message as ready for transmission according to the SPC protocol to a first transmitter 34 or output stage operating according to a first transmission technique, and, in parallel, to a second transmitter 36 or current modulator, operating according to a second, different transmission technique. In the particular example, the first transmitter operates in the voltage domain, i.e., the transmission technique relies on the variation of voltage levels on the bus line connected to the first terminal 20, as described in the specification of the SPC protocol. To this end, different voltage levels can be defined and the transition from one voltage level to the other voltage level indicates the start of a time measurement according to the SPC protocol.

In parallel, the second message is processed by the second transmitter 36, which is operating in the current domain. That is, the physical layer implementation differs from that of the first transmitter 34 in that the transitions between the different states of the SPC protocol are signaled by differing current levels. To this end, for example, a current level representing a logical "low" state can be defined to be one half of a current level associated to the logical "high" state.

However, further embodiments may, of course, define other voltage and/or current levels to transmit or signal the transition between the different states.

In utilizing an embodiment of a controller 2 as illustrated in FIG. 3, one can use a standard, three wired SPC-bus and a corresponding receiver to read out or gather information from the sensors 14 and 16 associated to the controller 2. Furthermore, the functional safety can be enhanced significantly in that the second transmitter 36 operates in parallel to the first transmitter 34, so as to be able to receive the required information on the sensor signals even if one of the transmission paths associated to the terminals 20 and 22 fails.

This can increase the functional safety without having to implement two completely separate sensor and transmitter systems, each making use of the same technology. Embodiments therefore can be not only cheaper than such an approach but also be safer with respect to critical operating conditions and environments. As already previously indicated, systematic errors in two identical implementations can be avoided when implementing systems according to which two transmission paths are used with different transmission techniques in order to transmit messages to the same receiver.

Although FIG. 3 illustrates an embodiment where the content of the first and second messages is identical, i.e., containing identical information about the sensor signals, further embodiments be also send different content by different messages via the different transmission paths.

FIG. 4 shows a further exemplary embodiment which is, partly, identical to the embodiment discussed with respect to FIG. 3. Therefore, only the additional components differing from the implementation of FIG. 3 will be discussed shortly. While the first and second transmitters 34 and 36 still operate in the current and the voltage domain, the embodiment of FIG. 4 provides for the possibility of transmitting either separate messages or further enhancing the robustness of the system by scrambling the message before submission of the same in order, for example, to avoid burst errors or the like. To this end, the embodiment of FIG. 4 additionally comprises a second protocol generator 38, which can be operated autonomously from the protocol generator 32 providing the SPC-protocol. The second protocol generator 38 can also implement the SPC protocol. According to further embodiments, however, the second protocol generator 38 can also provide for another protocol capable of being submitted in the current domain, as for example a Manchester-coded protocol.

Irrespective of whether the protocols used in the protocol generators 32 and 38 are identical or not, the embodiment of FIG. 4 provides for the possibility of scrambling the messages prior to the submission to avoid additional errors. The embodiment of FIG. 4 furthermore provides for the possibility of activating or deactivating each of the protocol generators 32 and 38 independently. That is, the controller 2 of FIG. 4 is operable to selectively work in a first operating mode using only the first transmission technique (the first transmitter 34) or in a second operating mode using only the second transmission technique (the second transmitter 36). To this end, a first Schmitt-trigger 40 is connected with its input to the first signal terminal 20 and with its output to a steering or control input of the protocol generator 32. A second Schmitt-trigger 42 is connected with its input to the third signal terminal 24 and with its output to a control input of the second protocol generator 38. That is, when a voltage above a first predetermined threshold associated to the first Schmidt-trigger 40 is applied to the first terminal 20 by the receiver or the control unit associated to the controller 2, the first protocol generator 32 can be switched in an operative state. Equivalently, upon occurrence of a voltage above a second predetermined threshold on the third signal terminal 24, the second protocol generator 38 can be put in an operational state. To this end, a user of the controller 2 of the sensor system of FIG. 4 can configure the controller and the transmission techniques as to his specific needs, while the controller 2 does at the same time provide backwards compatibility to standard SPC implementations.

Figure 5:
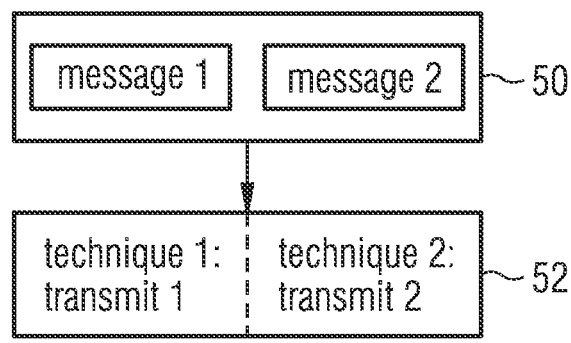
FIG. 5 shows a schematic illustration of an exemplary embodiment of a method for transmitting digital data messages.
Figure 6:
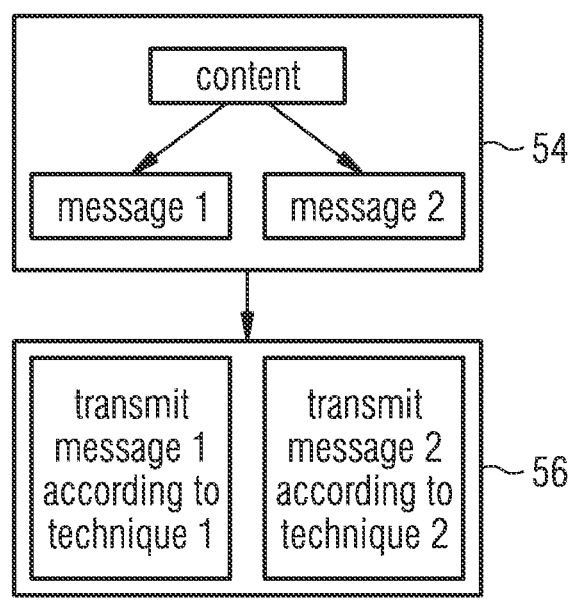
FIG. 6 shows a schematic sketch of a further exemplary embodiment of a method for transmitting digital data.

For the sake of completeness, FIGS. 5 and 6 illustrate schematically further exemplary embodiments of methods for transmitting digital data messages. FIG. 5 illustrates an exemplary embodiment of a method for transmitting digital data messages to a corresponding receiver via a communication link having at least a first and a second transmission path. In an optional provision step 50, first and second messages to be transmitted are provided.

To this end, it can be noted that the first and second messages can either be received from an external device, as for example illustrated in the embodiments of FIGS. 2 to 4 or, be created within the controller itself.

In a transmission step 52 the first message is digitally transmitted to the receiver via the first transmission path according to a first transmission technique. Furthermore, the transmission step comprises digitally transmitting the second message to the same receiver via the second transmission path according to a second transmission technique, the second transmission technique being different from the first transmission technique. Both transmissions may be performed in parallel or at the same time.

FIG. 6 schematically illustrates a further exemplary embodiment of a method for transmitting digital data to a corresponding receiver, according to which the same content is transmitted via two messages in order to provide for a redundancy increasing the functional safety of a system, as e.g. employed in automotive applications.

In a message creation step 54, a content to be transmitted is processed so that a first message is provided such that the first message comprises the content and a second message is provided such that also the second message comprises the content. Comprising the content in this respect means that the identical content can be reconstructed from either one of the messages according to a reconstruction rule. That is, both messages, when transmitted, transport the same information.

In a transmission step 56, the first message is transmitted according to the first transmission technique while the second message is transmitted according to the second transmission technique so as to allow for a redundant transmission and a possible reconstruction of the content even when one of the transmission techniques fails.

Figure 7:
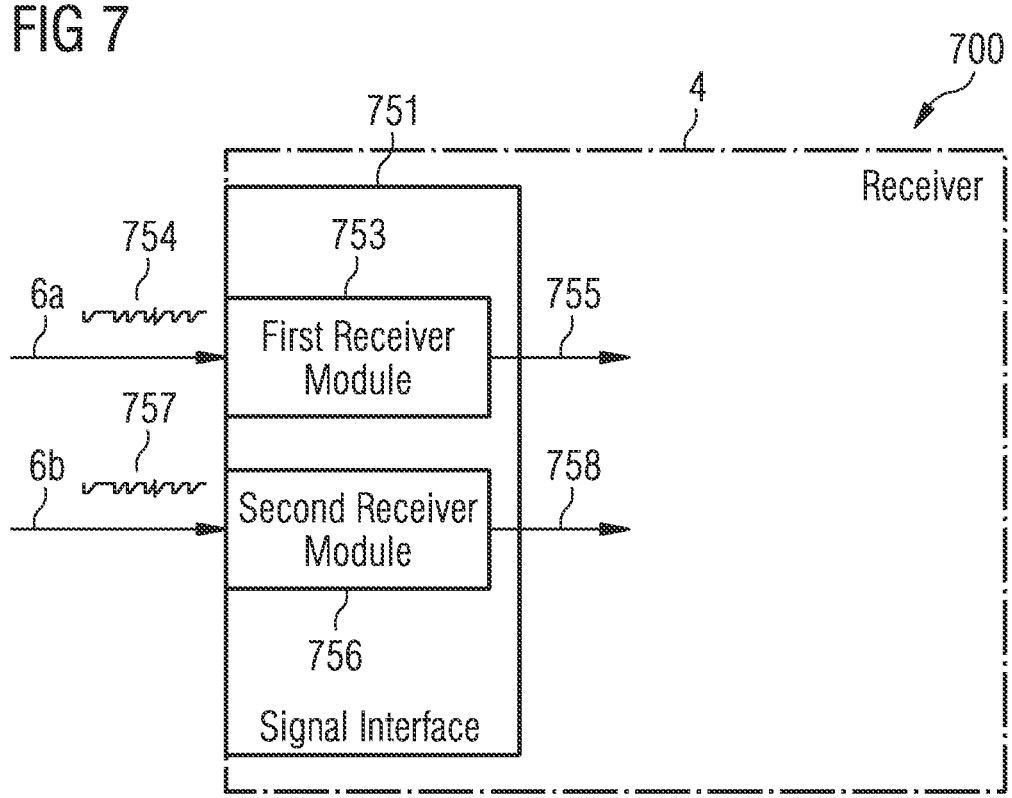
FIG. 7 shows a schematic illustration of a signal interface for a receiver.

FIG. 7 shows a schematic illustration 700 of a signal interface 751 for a receiver 4 which is capable of receiving a first message and a second message of a controller.

The signal interface 751 may include a first receiver module 753 configured to receive a first message 754 related to a content. The first receiver module 753 may be configured to generate a first adapted message 755 based on the first message 754 and a first transformation protocol. The signal interface 751 may further include a second receiver module 756 configured to receive a second message 757 related to the content. The second receiver module 756 may be configured to generate a second adapted message 758 based on the second message 757 and a second transformation protocol. The first transformation protocol and the second transformation protocol may be different.

Due to the implementation of the first receiver module 753 generating the first adapted message 755 based on the first message 754 and the first transformation protocol, and the second receiver module 756 generating the second adapted message 758 based on the second message 757 and the second transformation protocol, systematic faults and/or failures may be more easily recognized. For example, diverse redundancy may avoid systematic failures, as it is unlikely that different implementations (e.g. of different protocols) may cause the same implementation fault or react similarly towards common cause faults. Implementing two different receiver modules, each implementing different transformation protocols may provide different functional behavior, e.g. with respect to accuracy, timing and latency. Therefore, systematic failures may be more easily recognized.

The receiver 4 described herein with respect to FIG. 7 may be similar to the receiver 4 described with respect to FIGS. 1 to 6 and in particular, FIGS. 1 and 2. The receiver 4 may be configured to receive the first message 754 and the second message 757 from a controller (e.g. controller 2 of a sensor system) described with respect to FIGS. 1 to 6

The signal interface 751 may be configured to receive the first message 754 and the second message 757 via the communication link (e.g. the communication link 6), which may include a first transmission path 6a and a different second transmission path 6b. For example, the first receiver module 753 may be configured to receive the first message 754 from the first transmission path 6a of the communication link 6 and the second receiver module 756 may be configured to receive the second message 757 from the second transmission path 6b of the communication link 6 between the controller 2 of the sensor system and the receiver 4, for example. The first receiver module 753 may be configured to receive the first message 754 from a (first) output terminal or pin (e.g. terminal 8a) of the controller 2 of the sensor system as illustrated in FIGS. 3 and 4. Similarly, the second receiver module 756 may be configured to receive the second message 757 from a (second) output terminal (e.g. terminal 8b) or pin of the controller 2 of the sensor system.

The first receiver module 753 and the second receiver module 756 may be configured to receive messages encoded in accordance with a short pulse width modulation code Short PWM Code transmission (SPC) protocol or a single edge nibble transmission (SENT) protocol. The first message 754 and the second message 757 may correspond to the digital messages (e.g. the first message and the second message respectively) transmitted according to the first transmission technique and the second transmission technique described with respect to FIGS. 1 to 6. The first message 754 and the second message 757 may therefore include information on at least one of the sensor signals of the sensors 14 or 16 of FIGS. 3 and 4, for example. For example, the first message 754 and the second message 757 may include information being a representation of content provided by at least one of the sensor signals of the sensors 14 or 16.

In a non-limiting example, the first message 754 and the second message 757 transmitted by the controller 2 of the sensor systems described with respect to FIGS. 3 and 4 may each include or consist of a series of pulses where the distance between subsequent edges may define a transmitted data nibble related to the content. For example, the distance between consecutive falling (or rising) edges may define a transmitted 4-bit data nibble representing values from 0 to 15, in accordance with the SENT protocol.

The first receiver module 753 may be configured to receive the first message 754 transmitted by a controller 2 according to the first transmission technique. The second receiver module 756 may be configured to receive the second message 757 transmitted by the controller 2 according to the second transmission technique, which is different to the first transmission technique. The first message 754 transmitted according to the first transmission technique may include a voltage encoded signal or a current encoded signal. For example, variations in voltage level or voltage pulses may be used to transmit the first message according to the first transmission technique via a (first) signal terminal (e.g. 8a) of a controller 2. The second message 757 transmitted according to the second transmission technique may include a voltage encoded signal or a current encoded signal. For example, variations in current level or current pulses may be used to transmit the second message according to the second transmission technique via a second signal terminal (e.g. 8b) of the controller 2.

Optionally, the first message 754 transmitted according to the first transmission technique and the second message 757 transmitted according to the second transmission technique may both be voltage encoded signals or may both be current encoded signals. Alternatively, the first message 754 transmitted according to the first transmission technique may be a voltage encoded signal and the second message 757 transmitted according to the second transmission technique may be a current encoded signal. Alternatively, the first message 754 transmitted according to the first transmission technique may be a current encoded signal and the second message 757 transmitted according to the second transmission technique may be a voltage encoded signal.

The first message 754 may be encoded according to the first transmission technique (e.g. a first digital protocol). For example, the first message 754 may be a voltage encoded signal including a series of pulses representing or based on the content generated by the sensor system.

The first receiver module 753 may be configured to generate a digital first adapted message 755 based on the first transformation protocol being a digital protocol. For example, the first receiver module 753 may be configured to transform the first message to the second adapted message based on a digital protocol. In other words, the first receiver module 753 may be configured to generate a digital first adapted message 755 and/or to decode the first message based (only) on digital logic.

In some examples, the decoding of the first message based on digital logic may be based on a recognition of at least one signal feature in a digital message or signal. In some non-limiting examples, the recognition of digital logic may be based on a falling (or rising) edge of the digital message or signal, or may be based on the digital message or signal having a defined threshold value. In other words, the decoding based on digital logic may be edge-triggered, or may be triggered by a recognition of negative (or positive) predetermined values of the digital message or signal.

In a non-limiting implementation of a digital logic, the first receiver module 753 of the signal interface 751 may include a capture and compare unit configured to generate the digital first adapted message based on the first transformation protocol. For example, the capture and compare unit may be configured to generated a first adapted message based on a capture and compare protocol. In other words, the first transformation protocol may be a capture and compare protocol. To execute the capture and compare protocol, the capture and compare unit may be configured to carry out a time measurement (e.g. capture) between recognized features of the signal (e.g. between subsequent signal edges of the first message), and/or may be configured to compare the measured time with a predefined threshold value. The capture and compare unit may be configured to generate the first adapted message 757 using the time measurement between subsequent (e.g. falling and/or rising) signal edges of the first message, and/or the comparison of the measured time with a predefined threshold value.

The second message 754 may be encoded according to the second transmission technique (e.g. a second digital protocol). For example, the second message 757 may be a current encoded signal including a series of pulses representing or based on the content generated by the sensor system 802.

The second receiver module 756 may be configured to generate the second adapted message 758 based on an analog characteristic of the second message 757. For example, the second receiver module 756 may be configured to sample an amplitude (e.g. sampling at regular, predetermined or fixed time intervals) of the second message 757 to generate the second adapted message 758. For example, the second receiver module may include an analog to digital converter (ADC) module configured to generate a digital second adapted message 758 based on the second message 757, e.g. based on the analog characteristic of the second message 757.

It may be understood that analog decoding of the second message 758 may differ from digital decoding of the first message 754 in that digital decoding is triggered by the recognition of the first message signal features, whereas analog decoding is based on sampling of the second message signal itself.

The signal interface 751 may be part of an electronic control unit (ECU) of an automotive vehicle.

For illustrative purposes, a sensor system 802 similar to the sensor system illustrated in FIGS. 3 and 4 (and which may include a controller similar to controller 2) is illustrated in FIGS. 8A to 9E.

FIG. 8A shows a schematic illustration of a signal processing system 810 including a signal interface 751 for a receiver and an evaluator module 863.

The signal interface 751 shown in FIG. 8A may be similar to the signal interface described with respect to FIG. 7, for example.

As illustrated in FIG. 8A, the signal processing system 810 may include a sensor system 802. For example, the sensor system 802 may be part of or coupled to the signal processing system 810. The sensor system 802 may be configured to generate the content (and the first message 754 and the second message 757) based on information on a physical quantity determined by a sensor system. The signal processing system 810 may receive the first message 754 (based on the content) and the second message 757 (based on the content) from the sensor system 802.

The sensor system 802 may be coupled to the first receiver module 753 via a first transmission path 6a and to the second receiver module 756 via a second transmission path 6b. The sensor system 802 may include a controller 2 described with respect to FIGS. 1 to 6. For example, the sensor system 802 may include a sensor application specific integrated circuit (ASIC). The sensor system 802 may be configured to generate the content, where the content may be related to information on a physical quantity determined by the sensor system 802. In some non-limiting examples, the content generated may be indicative of a physical quantity sensed by a sensor 714, e.g. a magnetic-field sensor and/or a temperature sensor and/or a hall sensor. In other words, the first message 754 and the second message 757 may carry the same content information.

The evaluator module 863 may be configured to derive the content of at least one of the first message 754 and the second message 757 based on (or from) the first adapted message 755 and the second adapted message 758. In determining the content of the first adapted message 755 and the second adapted message 758, determining the integrity of the first transmission path 6a and the second transmission path 6b may be improved. For example, the evaluator module may determine errors in at least one of the first transmission path 6a and the second transmission path 6b if the content of the first adapted message 755 and the second adapted message 758 do not correspond or relate to each other with respect to a predefined relationship.

FIG. 8B shows a schematic illustration of a signal processing system 820. The signal processing system 820 may be similar to the signal processing system of FIG. 8A.

In addition, the signal processing system 820 may include at least one signal processing module 864 configured to derive the content of at least one of the first message 754 and the second message 757 based on (or from) the first adapted message 755 and the second adapted message 758. The at least one signal processing module 864 may be implemented in the evaluator module 863 or may be coupled to the evaluator module 863, for example. The at least one signal processing module 864 may be implemented by means of a computer program, a software or a microcontroller, for example and may execute the (first and/or the second) processing algorithms used for determining the first content from the first adapted message and the second content from the second adapted message, for example. Additionally, optionally or alternatively, the at least one signal processing module 864 may be implemented by means of hardware circuitry.

The signal processing module 864 may be configured to determine a first content of the first message 754 by a first processing scheme, and to determine a second content of the second message 757 by a second processing scheme; the second processing scheme being independently from the first processing scheme. In other words, the determination (e.g. the decoding) of the first content is uncorrelated to the determination of the second content by the signal processing module. For example, uncorrelated hardware circuitry or software algorithms may be used for the determination or decoding the first content and the second content.

Additionally or optionally, separate or different signal processing modules may be used for determining the first content from the first adapted message and the second content from the second adapted message. For example, the signal processing system 820 may include a first signal processing module (e.g. first ECU software or hardware circuitry) configured to determine a first content based on the first adapted message, and a second (different) signal processing module (second ECU software or hardware circuitry) configured to determine a second content based on the second adapted message. In other words, the determination of the first content is uncorrelated to the determination of the second content. The first adapted message 755 and the second adapted message 758 may be provided to the signal processing module 864 via different communication paths or links, for example. This may be a further way of providing diverse redundancy with regards to decoding adapted received messages.

Additionally or optionally, the at least one signal processing module 864 (e.g. the computer program, software or algorithm) or the evaluator module 863 may be used for determining whether the first adapted message 755 and the second adapted message 758 are in a predetermined relationship. In a non-limiting example, the evaluator module may determine whether the first adapted message 755 and the second adapted message 758 are identical to conclude that the first message 754 and the second message 757 have not been corrupted during their transmission. Since the first message 754 and the second message 757 are related to the same content, it may be concluded that the signal processing system 810 is functioning correctly or incorrectly. For example, if the first adapted message 754 and the second adapted message 758 correspond to each other with respect to a predefined relationship, as expected (or predetermined or predicted) for a correctly functioning signal processing system, then, it may be concluded that the signal processing system 810 (e.g. the first transmission path 6a and the second transmission path 6b) is functioning correctly. Similarly, if the first adapted message 754 and the second adapted message 758 do not correspond to each other with respect to the predefined relationship, then, it may be concluded that at least part of the signal processing system 810 (e.g. at least one of the first transmission path 6a or the second transmission path 6b) is not functioning correctly.

The signal processing system 810 may further include a control module 865 configured to control a use of at least one of the content of the first message and the content of the second message if the first adapted message is in the predefined relationship with (e.g. equal to) the second adapted message, e.g. if the first content corresponds to the second content. For example, the control module 865 may be configured to select content from at least one of the first message and the second message to be used in other parts of the signal processing system (e.g. providing visual or audio feedback to a user of the automotive vehicle). Alternatively or optionally, the control module 865 may be configured to use both content information derived from the first message and the second message for the same or different applications.

The control module 865 may be configured to generate an error signal signaling an error in at least one of the first adapted message and the second adapted message if the first adapted message is not in the predefined relationship with the second adapted message. For example, the error signal may be used to communicate the information that integrity and/or reliability of at least one of the transmission paths 6a or 6b has been compromised, which may result in the first adapted message not being in the expected predefined relationship with the second adapted message.

More details and aspects are mentioned in connection with embodiments described above or below. The embodiments described in FIGS. 8A & 8B may comprise one or more optional additional features corresponding to one or more aspects mentioned in connection with the proposed concept or one or more embodiments described above (e.g. FIGS. 1 to 8A) or below (e.g. FIGS. 9A to 11).

Figure 9A:
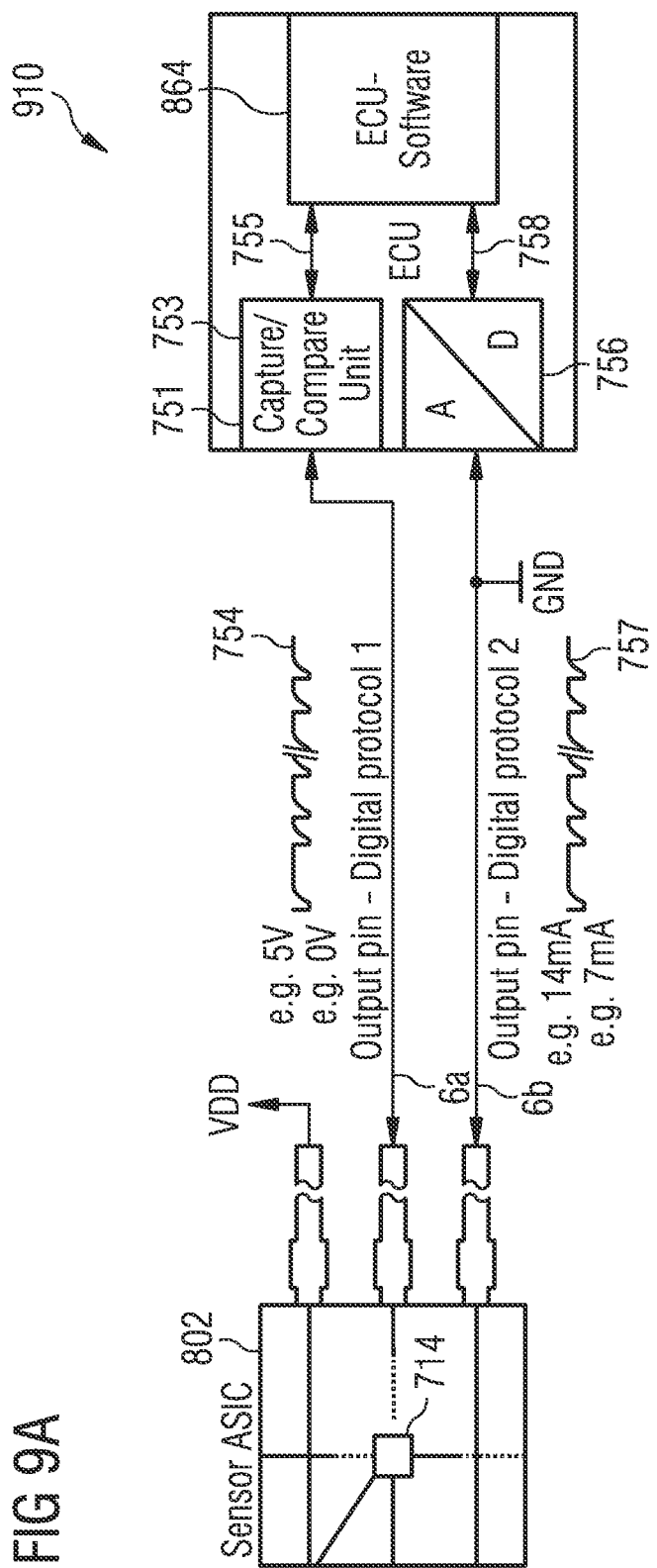
FIG. 9A shows a schematic illustration of a signal processing system including diverse or different input logic and a sensor system.

FIG. 9A shows a schematic illustration of a signal processing system 910 (including a sensor system) according to an embodiment.

The signal processing system 910 may include the sensor system 802, a communication link (e.g. a first transmission path 6a and a second transmission path 6b) and a signal interface 751 of a receiver. The signal processing system 910 shows two digital and diverse protocols for an ECU (implementing diverse or different input logic) and a sensor ASIC.

The signal interface 751 of the receiver may include the first receiver module 753 and the second receiver module 756. The receiver may be similar to the receiver which is part of the signal processing system described with respect to FIGS. 8A and 8B, and/or may be part of an electronic control unit (ECU) of an automotive vehicle, for example.

The first receiver module 753 may be configured to receive the first message 754 from a (first) output pin of the sensor system 802, where the first message 754 is encoded according to the first transmission technique (e.g. a first digital protocol). The first receiver module 753 of the signal interface 751 may include a capture and compare unit configured to generate a digital first adapted message based on the first transformation protocol.

The second receiver module 756 may include an analog to digital converter (ADC) module configured to generate a digital second adapted message 758 based on the second message 757, e.g. the analog characteristic of the second message 757.

In addition, the signal processing system 910 may further include the at least one signal processing module 864 (e.g. ECU software) configured to derive the content of at least one of the first message 754 and the second message 757 based on (or from) the first adapted message 755 and the second adapted message 758.

The signal processing system 910 shows a possible implementation of the control device (e.g. an ECU) implementing diverse or different input logic for decoding the first message and the second message according to diverse protocols.

More details and aspects are mentioned in connection with embodiments described above or below. The embodiments described in FIG. 9A may comprise one or more optional additional features corresponding to one or more aspects mentioned in connection with the proposed concept or one or more embodiments described above (e.g. FIGS. 1 to 8B) or below (e.g. FIGS. 9B to 11).

Figure 9B:
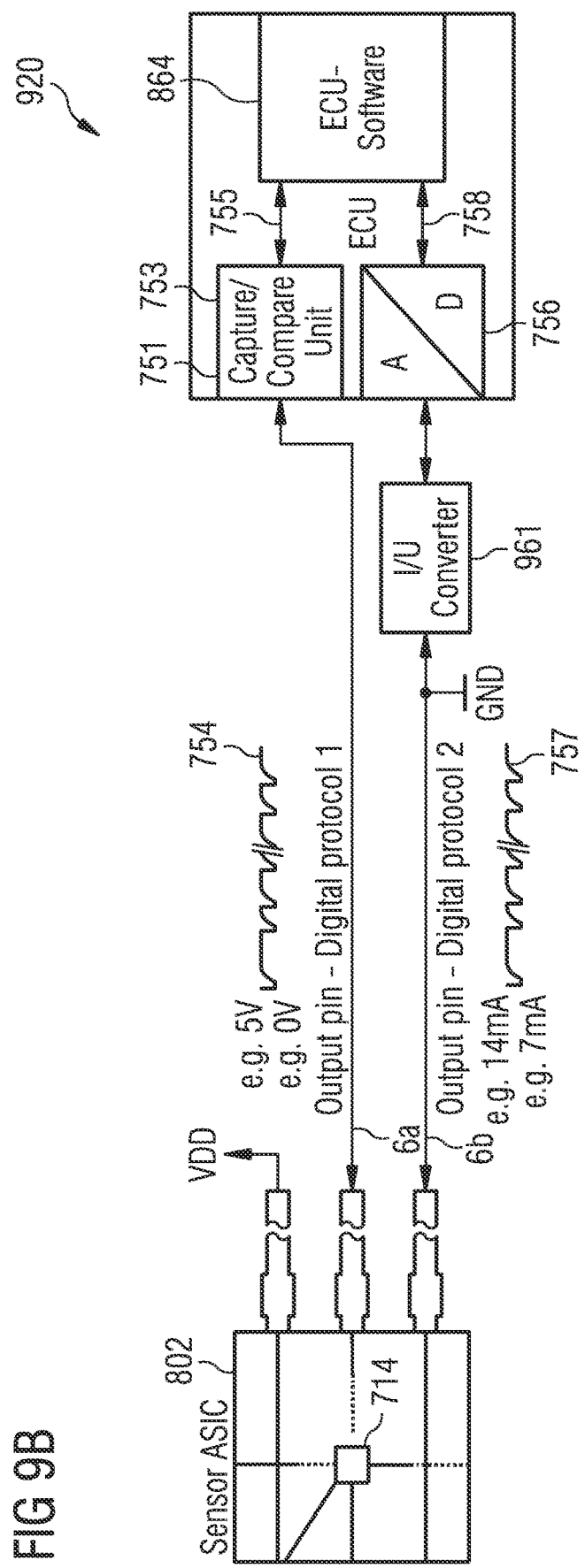
FIG. 9B shows a schematic illustration of a signal processing system including diverse or different input logic, a sensor system and a current to voltage converter.

FIG. 9B shows a schematic illustration of a signal processing system 920 according to an embodiment.

The signal processing system 920 may be similar to the signal processing systems described with respect to FIGS. 8A to 9A.

Additionally or optionally, the signal processing system 920 (e.g. the signal interface 751) may further include a current to voltage converter (I/U converter) module 961 coupled to the second receiver module 756. The current to voltage converter module 961 may be configured to convert a second receive current signal to a second receive voltage signal to be received by the second receiver module 756. Therefore, both the first message 754 and the second message 757 may be voltage-encoded signals, for example.

More details and aspects are mentioned in connection with embodiments described above or below. The embodiments described in FIG. 9B may comprise one or more optional additional features corresponding to one or more aspects mentioned in connection with the proposed concept or one or more embodiments described above (e.g. FIGS. 1 to 9A) or below (e.g. FIGS. 9C to 11).

Figure 9C:
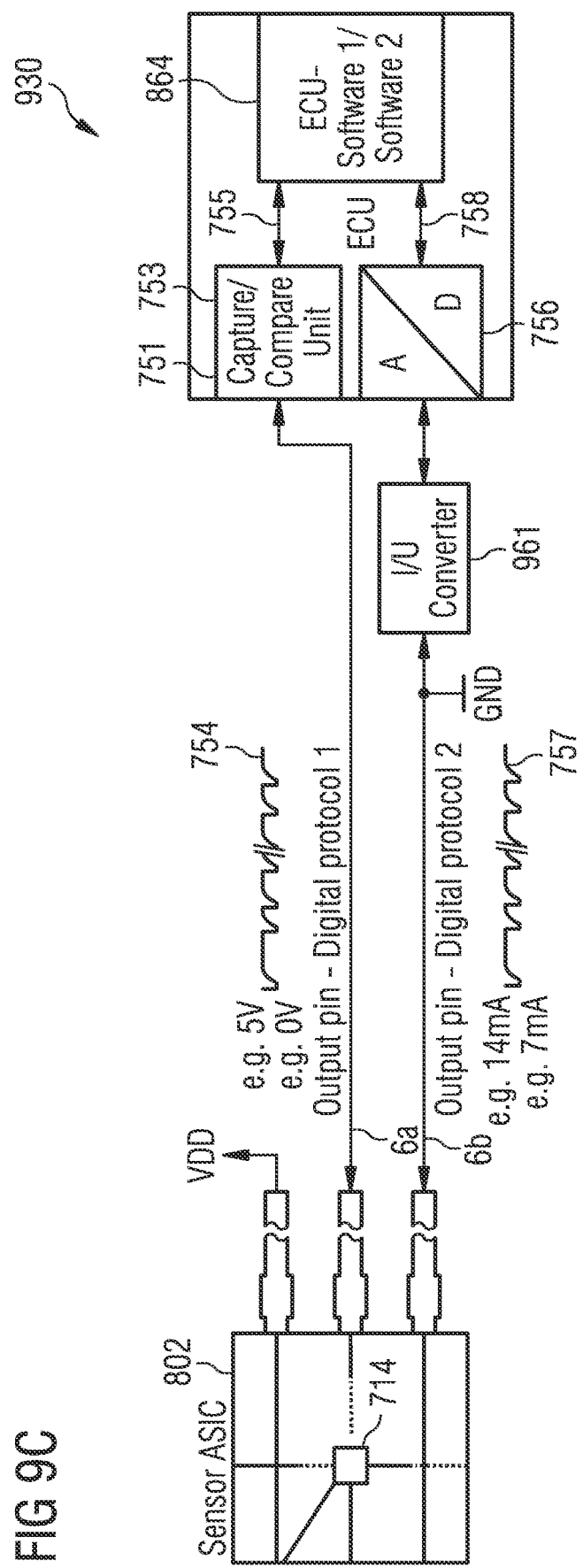
FIG. 9C shows a schematic illustration of a signal processing system including diverse or different input logic, diverse decoding software and a sensor system.

FIG. 9C shows a schematic illustration of a signal processing system 930 according to an embodiment.

The signal processing system 930 may be similar to the signal processing systems described with respect to FIGS. 8A to 9B. The signal processing system 930 shows two digital and diverse protocols for an ECU (implementing diverse or different input logic and diverse decoding software) and a sensor ASIC.

Additionally or optionally, (two) different signal processing modules may be used for processing messages from the first receiver module and the second receiver module. For example, a first signal processing module may include a first software (e.g. software 1) or algorithm for decoding information related to the first characteristic of the first adapted message and/or to derive the content of the first message. Additionally, a second different signal processing module may include a second different software (e.g. software 2) or algorithms for decoding information related to the second characteristic of the second adapted message and/or to derive the content of the second message.

More details and aspects are mentioned in connection with embodiments described above or below. The embodiments described in FIG. 9C may comprise one or more optional additional features corresponding to one or more aspects mentioned in connection with the proposed concept or one or more embodiments described above (e.g. FIGS. 1 to 9B) or below (e.g. FIGS. 9D to 11).

FIG. 9D shows a schematic illustration of a signal processing system 940 according to an embodiment.

The signal processing system 940 may be similar to the signal processing systems described with respect to FIGS. 8A to 9C. The signal processing system 940 shows a further possible implementation with two control devices, which comprise different input structures for decoding the two protocols. The signal processing system 940 may have two digital and diverse protocols for two ECUs (implementing diverse or different input logic) and a sensor ASIC.

For example, the receiver may include a first receiver and a second receiver, which may include different components to the first receiver. For example, the first receiver may include a first ECU or may be part of a first ECU and the second receiver may include a second ECU or may be part of a second ECU. Optionally or alternatively, the first receiver may be located in or be part of a first partial circuit of an ECU and the second receiver may be located in or be part of a second partial circuit of the ECU. The first receiver module 753 and the first signal processing module 864a may be located in the first receiver, and the second module 756 and the second signal processing module 864b may be located in the second receiver.

The first signal processing module 864a may be configured to derive the content of the first message 754 based on the first adapted message 755 and the second signal processing module 864b may be configured to derive the content of the second message 757 based on the second adapted message 758.

More details and aspects are mentioned in connection with embodiments described above or below. The embodiments described in FIG. 9D may comprise one or more optional additional features corresponding to one or more aspects mentioned in connection with the proposed concept or one or more embodiments described above (e.g. FIGS. 1 to 9C) or below (e.g. FIGS. 9E to 11).

FIG. 9E shows a schematic illustration of a signal processing system 950 according to an embodiment.

The signal processing system 950 may be similar to the signal processing systems described with respect to FIGS. 8A to 9D. For example, the signal processing system 940 may include the current to voltage converter 961 and the at least one (e.g. one or two) different signal processing modules (e.g. 864). Furthermore, the signal processing system 950 may include two sensors (e.g. sensor ASICs) capable of implementing diverse or different protocols. The signal processing system 850 may further include an ECU capable of implementing diverse or different input logic and/or diverse or different ECU software for decoding messages received by the receiver according to at least two digital and diverse protocols.

For example, the first receiver module 753 may be configured to receive the first message 754 from a first transmission path 6a of a first sensor system 802a (e.g. from a first sensor ASIC 14 as shown in FIGS. 3 and 4). The second receiver module 756 may be configured to receive the second message 757 from a second transmission path 6b of a second sensor system 802b different to the first sensor system 802a (e.g. from a second sensor ASIC 16 as shown in FIGS. 3 and 4).

Furthermore, the signal processing system may include a signal processing module 864 which may include a first software implementation and a second software implementation. For example, the first software (e.g. software 1) or algorithm may be configured for decoding information related to the first characteristic of the first adapted message and/or to derive the content of the first message. Additionally, the second software (e.g. software 2) or algorithms may be configured for decoding information related to the second characteristic of the second adapted message and/or to derive the content of the second message.

More details and aspects are mentioned in connection with embodiments described above or below. The embodiments described in FIG. 9E may comprise one or more optional additional features corresponding to one or more aspects mentioned in connection with the proposed concept or one or more embodiments described above (e.g. FIGS. 1 to 9D) or below (e.g. FIGS. 10 to 11).

The signal processing systems described above (e.g. 810, 820, 910, 920, 930, 940, 950) may each be part of an electronic control unit (ECU) of an automotive vehicle.

In summary, up until now, functional safety requirements (e.g. the redundancy), may be achieved through the application of two identical, digital protocols between a sensor ASIC and the signal processing system (e.g. an ECU or control device), thereby introducing redundancy in transmission by transmitting identical messages over two individual signal lines 6a, 6b. However, if the same hardware and software blocks are used in the ECU to process sensor input information or more generally speaking the first and second messages, systematic failures of this processing in the ECU cannot be recognized or detected as the same hardware and software blocks are used for processing of the messages. Using non-diverse processing of the messages of, e.g. a sensor system, within the ECU may hamper reliability due to diverse (transmission) sensor protocols (e.g. combined current/voltage protocols) being lost. For examples, the "bottle neck" of the system may be the ECU. Through the diverse implementation within the ECU (hardware and/or software), the improvements due to a diverse implementation of a Sensor ASIC and a diverse transmission protocol between the sensor ASIC and the control device may be retained. A diverse hardware (HW) and/or software (SW) implementation within an ECU (or two ECUs) for decoding such protocols may be used, thereby extending diversity from the sensor system to the signal processing at the ECU which increases diagnostic coverage of a system formed by a sensor system as for example illustrated in FIGS. 3 and 4 and an associated receiver as illustrated in FIG. 7 or a signal processing system as illustrated subsequently in FIGS. 8A to 9E.

FIG. 10 shows a flow chart of a method 1000 for receiving signals.

The method 1000 includes receiving 1010 by a first receiver module a first message related to a content.

The method 1000 further includes generating 1020 a first adapted message based on the first message and a first transformation protocol.

The method 1000 further includes receiving 1030 by a second receiver module a second message related to the content.

The method 1000 further includes generating 1040 a second adapted message based on the second message and a second transformation protocol different to the first transformation protocol.

Due to the implementation of generating the first adapted message based on the first message and the first transformation protocol and generating the second adapted message based on the second message and the second transformation protocol, systematic faults and/or failures may be more easily recognized.

More details and aspects are mentioned in connection with embodiments described above or below. The embodiments described in FIG. 10 may comprise one or more optional additional features corresponding to one or more aspects mentioned in connection with the proposed concept or one or more embodiments described above (e.g. FIGS. 1 to 9E) or below (e.g. FIG. 11).

FIG. 11 shows a schematic illustration of a signal processing system 1100 including a signal interface 751 for a receiver and signal processing module 1164.

The signal interface 751 may include a first receiver module 753 configured to receive a first message 754 related to a content. The first receiver module 753 may be configured to generate a first adapted message 755 based on the first message 754 and a first transformation protocol. The signal interface 751 may further include a second receiver module 756 configured to receive a second message 757 related to the content. The second receiver module 756 may be configured to generate a second adapted message 758 based on the second message 757 and a second transformation protocol. The first transformation protocol and the second transformation protocol may be different.

The signal processing module 1164 may be configured to determine a content of the first message 754 by a first processing scheme, and to determine a content of the second message 757 by a second processing scheme, wherein the second processing scheme is independent from the first processing scheme.

Due to the implementation of the second processing scheme being independent from or uncorrelated to the first processing scheme, systematic faults and/or failures may be more easily recognized. For example, diverse redundancy may avoid systematic failures, as it is unlikely that processing schemes may cause the same implementation fault or react similarly towards common cause faults.

More details and aspects are mentioned in connection with embodiments described above or below. The embodiments described in FIG. 10 may comprise one or more optional additional features corresponding to one or more aspects mentioned in connection with the proposed concept or one or more embodiments described above (e.g. FIGS. 1 to 10) or below.

Aspects and features (e.g. the signal interface, the receiver, the first receiver module, the second receiver module, the first transmission technique, the second transmission technique, the first transformation protocol, the second transformation protocol, the evaluator module, the signal processing module, the control module, the current to voltage converter, the sensor system, the first transmission path, the second transmission path, the first message, the second message, the first adapted message, the second adapted message, the capture and compare module, the analog to digital converter module, the short pulse width modulation code transmission protocol (SENT), the single edge nibble transmission protocol (SPC), the predefined relationship, the first characteristic, the second characteristic, the first processing scheme, the second processing scheme and the content) mentioned in connection with one or more specific examples may be combined with one or more of the other examples.

Various embodiments relate to a diverse system (Control unit and sensor) for safety-critical applications in the automotive (automobile) field with two diverse digital protocols. For example, the embodiments relate to a diverse decoding in a control device (ECU) of (at least) two diverse digital protocols which are transmitted from a sensor ASIC.

Various embodiments related to functional safety requirements based on a SPC protocol. Various embodiments relate to using SPC protocols to create a redundancy e.g. using two signal paths and/or two digital signal processors. In some embodiments, two SPC protocols, one for voltage protocol and one current protocol (e.g. having an Ilow to Ihigh ratio of 1:2) may be used for a magnetic sensor system. Additionally, the data transmitted using the SPC protocol (in the voltage or the current domain) may be transmitted in an inverted fashion to increase the redundancy. Various embodiments relate to a magnetic sensor with two SPC protocols (e.g. current and voltage signals).

According to exemplary embodiments, a controller operable to transmit digital data messages to a receiver via a communication link providing for at least a first and a second transmission path includes a first signal terminal for the first transmission path and a second signal terminal for the second transmission path. The first signal terminal is operable to digitally transmit a first message to the receiver according to a first transmission technique while the second signal terminal is operable to digitally transmit a second message to the receiver according to a second different transmission technique. That is, the controller sends, to the same receiver, messages using two different transmission techniques at the same time or in parallel, wherein parallel transmission may also include scenarios where the first and second messages are sent with a predetermined time difference or one after the other. This may serve to increase functional safety by introducing redundancy into the transmission scheme. Functional safety may even be increased to a higher extent as compared to an approach where two independent identical communication links are redundantly used, since two different transmission techniques are utilized to communicate with the same receiver. For example, this may avoid that systematic errors cease transmission, which might occur at the same time in redundant systems relying on the same transmission technique.

According to exemplary embodiments, a content transmitted by the first and the second messages by the different transmission techniques is identical. This can serve to increase the reliability in that the content can still be transmitted or received to or by the receiver even when one of the transmission techniques encounters an error.

According to exemplary embodiments utilizing a data bus including at least a first bus line for the first transmission path and a second bus line for the second transmission path, the first transmission technique uses a variation of a voltage on the bus or on a first signal terminal connected to the bus in order to transmit the message while the second transmission technique uses a variation of a current on the second bus line or on a second signal terminal connected to the same. This can increase reliability of the transmission in scenarios, where external influences may distort voltages and, to a lesser extent, currents or vice-versa.

According to exemplary embodiments, a controller is operable to be used together with a data bus having at least a first bus line for digitally transmitting a first message, a second bus line for providing a reference potential and a third bus line for providing an operating voltage, that is in a system where the controller is powered by an operating voltage from the receiver and via the bus. A first signal terminal of the controller is connectable to the first bus line and operable to digitally transmit the first message according to the SPC (Short PWM Code) protocol, varying a voltage on the first signal terminal to transmit the message. A second signal terminal of the controller is connectable to the second bus line and operable to digitally transmit the second message to the receiver according to the SPC protocol, using a variation of a current on the second signal terminal to physically transmit the second message. A third terminal of the controller is connected to the third bus line providing the operating voltage. This can allow integration of a controller for transmitting data messages in a backwards-compatible manner into an existing system based on the SPC protocol. The functional safety can optionally be increased when the second transmission technique using a variation of a current is used. The same controller, however, can still be utilized with standard setups in already existing environments.

According to exemplary embodiments, a sensor system also includes a sensor operable to provide a sensor signal indicative of a physical quantity sensed by said sensor, wherein the controller further includes a sensor input terminal coupled to the sensor. The received sensor signal or the content provided by the sensor signal may then be transmitted via the two different transmission techniques. This can, in an inexpensive and efficient manner, increase the functional safety of systems relying on sensor data also in unfriendly environments, such as, for example, in automobiles.

Some embodiments include a digital control circuit installed within an apparatus for performing a transmission as illustrated above. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor.

Various embodiments relate to transmission of digital data messages to a receiver via a communication link. Various embodiments related to a method, apparatus and computer program for digital transmission of messages.

Some embodiments relate to a controller operable to transmit digital data messages to a receiver via a communication link having at least a first and a second transmission path, the controller including: a first signal terminal for the first transmission path, the first signal terminal being operable to digitally transmit a first message to the receiver according to a first transmission technique; and a second signal terminal for the second transmission path, the second signal terminal being operable to digitally transmit a second message to the receiver according to a second, different transmission technique.

In some embodiments, at least one message of the group of the first message and the second message is transmitted using a serial transmission protocol using signals of varying width to represent digital content.

In some embodiments, a digital quantity is represented by two consecutive signal pulses transmitted with a time difference of a predetermined number of common clock time intervals, the predetermined number being related to the digital quantity.

In some embodiments, a common clock time interval for the transmission according to the serial transmission protocol is signaled from the controller to the receiver using a preamble to a content of a transmitted message, wherein a time difference between two signal pulses in the preamble corresponds to an integer multiple of the common clock time interval.

In some embodiments, a content transmitted by the first and the second messages is identical.

In some embodiments, an order of bits used to transmit the content in the first message is different than an order of bits used to transmit the identical content in the second message.

In some embodiments, the length of a first sequence of bits used to transmit the content in the first message and of a second sequence of bits used to transmit the identical content in the second message is identical, wherein the bit value of each bit at a given position in the first sequence is the inverse of the bit value of the bit at the same position in the second sequence.

In some embodiments, the communication link includes a data bus including at least a first bus line for the first transmission path and a second bus line for the second transmission path.

In some embodiments, the first transmission technique uses a variation of a voltage on the first signal terminal to transmit the first message.

In some embodiments, the second transmission technique uses a variation of a current on the second signal terminal to transmit the second message.

In some embodiments, the data bus includes a third bus line for supplying an operating voltage to a third signal terminal of the controller, and wherein the second bus line serves to provide a reference potential for the operating voltage.

In some embodiments, the controller further includes a sensor input terminal for receiving a sensor input signal indicative of a physical quantity sensed by a sensor.

In some embodiments, the digital serial transmission protocol corresponds to the SPC (Short PWM Code) or the SENT (Single Edge Nibble Transmission) protocol.

In some embodiments, both messages of the group are transmitted according to the SPC or the SENT protocol.

In some embodiments, the controller is further operable to selectively work in a first operating mode using only the first transmission technique or in a second operating mode using only the second transmission technique.

In some embodiments, the controller is further operable to evaluate a signal condition on the first and/or on the third terminal and to enter the first or the second operating mode upon occurrence of a predetermined condition on the first and/or the third terminal, respectively.

In some embodiments, the predetermined condition is the exceeding of a predetermined voltage level on the first terminal and/or on the third terminal, respectively.

Some embodiments relate to a controller operable to transmit digital data messages to a corresponding receiver via a data bus having at least a first bus line for digitally transmitting a first message, a second bus line for providing a reference potential and a third bus line for providing an operating voltage, the controller including: a first signal terminal for the first bus line, the first signal terminal being operable to digitally transmit the first message to the receiver according to the SPC protocol and a variation of a voltage on the first signal terminal to transmit the first message; a second signal terminal for the second bus line, the second signal terminal being operable to digitally transmit a second message to the receiver according to the SPC protocol; and a third signal terminal for the third bus line, wherein the second message is transmitted using a variation of a current between the second signal terminal and the third signal terminal.

In some embodiments, the controller is further operable to selectively work in a first operating mode using only the first transmission technique or in a second operating mode using only the second transmission technique.

In some embodiments, the controller further includes a sensor input terminal for receiving a sensor input signal indicative of a physical quantity sensed by a sensor.

Some embodiments relate to a sensor system, including: a sensor operable to provide a sensor signal indicative of a physical quantity sensed by said sensor; and a controller operable to transmit digital data messages to a corresponding receiver via a data bus having at least a first and a second transmission line, the controller including: a sensor input terminal coupled to the sensor, the sensor input terminal being operable to receive the sensor signal; a first signal terminal for the first transmission line, the first signal terminal being operable to digitally transmit a first message to the receiver according to a first transmission technique, the first message including information on the sensor signal; and a second signal terminal for the second transmission line, the second signal terminal being operable to digitally transmit a second message to the receiver according to a second, different transmission technique, the second message including information on the sensor signal.

Some embodiments relate to a method for transmitting digital data messages to a corresponding receiver via a communication link having at least a first and a second transmission path, the method including: digitally transmitting a first message to the receiver via the first transmission path according to a first transmission technique; and digitally transmitting a second message to the receiver via the second transmission path according to a second transmission technique, the second transmission technique being different from the first transmission technique.

In some embodiments, transmitting according to the first transmission technique includes varying a voltage on a first signal terminal associated with the first transmission path; wherein transmitting according to the second transmission technique includes varying a current on a second signal terminal associated with the second transmission path; and wherein the first message is transmitted according to the SPC or the SENT protocol.

In some embodiments, the method further includes receiving a content to be transmitted; and providing the first message such that the first message includes the content; and providing the second message such that the second message includes the content.

Some embodiments relate to a computer program having a program code for performing a method for transmitting digital data messages to a corresponding receiver via a communication link having at least a first and a second transmission path when the computer program is executed on a computer or processor, the method including: digitally transmitting a first message to the receiver via the first transmission path according to a first transmission technique; and digitally transmitting a second message to the receiver via the second transmission path according to a second transmission technique, the second transmission technique being different from the first transmission technique.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A signal interface for a receiver, comprising:
a first receiver configured to receive a first message related to a content from a controller or a sensor system,
wherein the first receiver is configured to generate a first adapted message using the first message, the first adapted message being based on digital logic in accordance with an application of a first transformation protocol; and
a second receiver configured to receive, independently of the first message, a second message related to the content from the controller or the sensor system,
wherein the second receiver is configured to generate a second adapted message using the second message, the second adapted message being based on an analog characteristic of the second message in accordance with an application of a second transformation protocol, and
wherein the first transformation protocol and the second transformation protocol are different.

2. The signal interface according to claim 1, wherein the first receiver is configured to generate the first adapted message based on the first transformation protocol being a digital protocol.

3. The signal interface according to claim 1, wherein the first adapted message that is generated based on digital logic is generated based on at least one of edge-triggered recognition of the first message, a recognition of pre-determined values of the first message, and a time measurement between signal edges of the first message.

4. The signal interface according to claim 1, wherein the first receiver comprises a capture and comparator configured to generate the first adapted message based on the first transformation protocol.

5. The signal interface according to claim 1, wherein the second receiver comprises an analog to digital converter configured to generate the second adapted message based on the second message.

6. The signal interface according to claim 1, wherein the second receiver is configured to sample an amplitude of the second message to generate the second adapted message.

7. The signal interface according to claim 1, wherein the first receiver is configured to receive the first message from a first transmission path of a sensor system, and wherein the second receiver is configured to receive the second message from a second transmission path of the sensor system.

8. The signal interface according to claim 1, wherein the first receiver and the second receiver are configured to receive messages encoded in accordance with at least one of a short pulse width modulation code transmission (SPC) protocol and a single edge nibble transmission (SENT) protocol.

9. The signal interface according to claim 1, wherein the first receiver is configured to receive the first message transmitted according to a first transmission technique, and
wherein the second receiver is configured to receive the second message transmitted according to a second transmission technique that is different from the first transmission technique.

10. The signal interface according to claim 9, wherein the first message transmitted according to the first transmission technique and the second message transmitted according to the second transmission technique each comprises a voltage encoded signal or a current encoded signal.

11. The signal interface according to claim 9, wherein the first message transmitted according to the first transmission technique comprises a voltage encoded signal, and
wherein the second message transmitted according to the second transmission technique comprises a current encoded signal.

12. The signal interface according to claim 1, further comprising a current to voltage converter coupled to the second receiver, wherein the current to voltage converter is configured to convert a second received current signal to a second receive voltage signal to be received by the second receiver.

13. The signal interface according to claim 1, wherein the content associated with the first message is the same as the content associated with the second message, the content being related to information on a physical quantity determined by a sensor system.

14. The signal processing system according to claim 1, wherein the signal interface is part of an electronic control unit of an automotive vehicle.

15. The signal interface according to claim 1, wherein the first adapted message and the second adapted message are different.

16. The signal interface according to claim 1, wherein the first receiver is configured to perform digital decoding of the first message to generate the first adapted message, and
wherein the second receiver is configured to perform analog decoding of the second message to generate the second adapted message.

17. The signal interface according to claim 16, wherein the digital decoding of the first message is performed via recognition of signal features associated with first message, and wherein the analog decoding of the second message is performed by sampling an amplitude of the second message.

18. The signal interface of claim 16, wherein the first message and the second message are received concurrently by the first receiver and the second receiver, respectively, and
wherein the content associated with the first message is the same as the content associated with the second message, the content being related to information on a physical quantity determined by a sensor system.

19. The signal interface of claim 16, wherein the first message and the second message are digital messages.

20. A signal processing system, comprising:
a signal interface; and
an evaluator;
wherein the signal interface comprises:
a first receiver configured to receive a first message related to a content from a controller or a sensor system, wherein the first receiver is configured to generate a first adapted message using the first message the first adapted message being based on digital logic in accordance with an application of a first transformation protocol; and
a second receiver configured to receive, independently of the first message, a second message related to the content from the controller or the sensor system, wherein the second receiver is configured to generate a second adapted message using the second message, the second adapted message being based on an analog characteristic of the second message in accordance with an application of a second transformation protocol, wherein the first transformation protocol and the second transformation protocol are different, and
wherein the evaluator is configured to determine whether the first adapted message is in a predefined relationship with the second adapted message.

21. The signal processing system according to claim 20, further comprising at least one signal processor configured to derive the content of at least one of the first message and the second message based on the first adapted message and the second adapted message.

22. The signal processing system according to claim 20, further comprising a first signal processor configured to determine a first content based on the first adapted message, and a second signal processor configured to determine a second content based on the second adapted message.

23. The signal processing system according to claim 20, further comprising a signal processor configured to determine a first content of the first message by a first processing scheme, and to determine a second content of the second message by a second processing scheme, the first processing scheme being independent from the second processing scheme.

24. The signal processing system according to claim 20, further comprising a controller configured to control a use of at least one of first content of the first message and second content of the second message if the first content corresponds to the second content.

25. The signal processing system according to claim 20, further comprising a controller configured to generate an error signal signaling an error in at least one of the first adapted message and the second adapted message if the first adapted message is not in a predefined relationship with the second adapted message.

26. The signal processing system according to claim 20, further comprising a sensor system configured to generate the content based on information on a physical quantity determined by the sensor system.

27. The signal processing system according to claim 26, wherein the sensor system comprises a magnetic field sensor or a hall sensor.

28. The signal processing system according to claim 26, wherein the sensor system is coupled to the first receiver via a first transmission path and to the second receiver via a second transmission path, and
wherein the sensor system is configured to generate the first message and the second message.

29. A method for receiving signals, the method comprising:
receiving, by a first receiver, a first message related to a content from a controller or a sensor system;
generating a first adapted message using the first message, the first adapted message being based on digital logic in accordance with an application of a first transformation protocol;
receiving, by a second receiver, independently of the first message, a second message related to the content from the controller or the sensor system; and
generating a second adapted message using the second message the second adapted message being based on an analog characteristic of the second message in accordance with an application of a second transformation protocol different from the first transformation protocol.

30. A controller operable to transmit digital data messages to a receiver via a communication link having at least a first transmission path and a second transmission path, the controller comprising:
a first signal terminal for the first transmission path, the first signal terminal being operable to digitally transmit a first message related to a content to the receiver according to a first transmission technique; and
a second signal terminal for the second transmission path, the second signal terminal being operable to digitally transmit, independently of the first message, a second message related to the content to the receiver according to a second, different transmission technique,
wherein the first message and the second message are transmitted either at the same time or in parallel,
wherein the first message is, upon being received by the receiver, used to generate a first adapted message based on digital logic in accordance with an application of a first transformation protocol,
wherein the second message is, upon being received by the receiver, used to generate a second adapted message based on an analog characteristic of the second message in accordance with an application of a second transformation protocol, and
wherein the first transformation protocol and the second transformation protocol are different.

31. A signal processing system, comprising:
a signal interface and a signal processor;
wherein the signal interface comprises
a first receiver configured to receive a first message related to a content from a controller or a sensor system, wherein the first receiver is configured to generate a first adapted message using the first message, the first adapted message being based on digital logic in accordance with an application of a first transformation protocol;
a second receiver configured to receive, independently of the first message, a second message related to the content from the controller or the sensor system, wherein the second receiver is configured to generate a second adapted message using the second message, the second adapted message being based on an analog characteristic of the second message in accordance with an application of a second transformation protocol, wherein the first transformation protocol and the second transformation protocol are different, wherein the signal processor is configured to determine a content of the first message by a first processing scheme, and to determine a content of the second message by a second processing scheme, and wherein the second processing scheme is independent from the first processing scheme.

* * * * *